(12) United States Patent
Katsura et al.

(10) Patent No.: US 7,688,508 B2
(45) Date of Patent: *Mar. 30, 2010

(54) DIFFUSION SHEET, REAR PROJECTION SCREEN PROVIDED WITH DIFFUSION SHEET, METHOD OF MANUFACTURING MOLD FOR DIFFUSION SHEET, AND METHOD OF MANUFACTURING DIFFUSION SHEET

(75) Inventors: Yuki Katsura, Tokyo-To (JP); Masahiro Goto, Tokyo-To (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 22 days.

This patent is subject to a terminal disclaimer.

(21) Appl. No.: 12/149,364

(22) Filed: Apr. 30, 2008

(65) Prior Publication Data
US 2008/0212178 A1    Sep. 4, 2008

Related U.S. Application Data

(62) Division of application No. 10/518,305, filed as application No. PCT/JP2004/004202 on Mar. 25, 2004, now Pat. No. 7,453,639.

(30) Foreign Application Priority Data

Mar. 25, 2003  (JP)  ............................ 2003-082693
Apr. 24, 2003  (JP)  ............................ 2003-119588

(51) Int. Cl.
*G03B 21/56* (2006.01)
*G03B 21/60* (2006.01)
*G02B 3/08* (2006.01)

(52) U.S. Cl. .................. 359/460; 359/743; 359/453; 359/457

(58) Field of Classification Search ................. 359/460, 359/743, 453, 452, 457, 742
See application file for complete search history.

(56) References Cited

U.S. PATENT DOCUMENTS

| 4,468,092 A | 8/1984 | Inoue et al. |
| 4,767,186 A | 8/1988 | Bradley, Jr. et al. |
| 6,417,966 B1 | 7/2002 | Moshrefzadeh et al. |

(Continued)

FOREIGN PATENT DOCUMENTS

JP    A-61-95330    5/1986

(Continued)

*Primary Examiner*—Georgia Y Epps
*Assistant Examiner*—Magda Cruz
(74) *Attorney, Agent, or Firm*—Oliff & Berridge, PLC

(57) ABSTRACT

In a diffusion sheet, a plurality of approximately trapezoidal columnar unit lens portions are disposed such that the long-axis directions thereof are in parallel with each other, and all the surfaces of the unit lens portions, which correspond to the long bottom segments of the approximately trapezoidal sections of the unit lens portions are disposed on a light-incident-side flat surface. Further, light absorbing portions are disposed in the grooves between adjacent unit lens portions to absorb and/or shield external light incident from a light outgoing side. In the diffusion sheet arranged as described above, light incident on the unit lens portions from a light incident side is totally reflected on the surfaces corresponding to the side segments of the approximately trapezoidal sections vertical to the long-axis direction of the unit lens portions and outgoes from the light outgoing side.

9 Claims, 12 Drawing Sheets

U.S. PATENT DOCUMENTS

| | | | |
|---|---|---|---|
| 6,995,907 B2 * | 2/2006 | Osawa et al. | 359/460 |
| 7,072,109 B2 * | 7/2006 | Goto et al. | 359/460 |
| 7,453,639 B2 * | 11/2008 | Katsura | 359/460 |
| 2002/0126377 A1 | 9/2002 | Nakagawa et al. | |
| 2002/0191283 A1 | 12/2002 | Browning | |
| 2008/0212177 A1 * | 9/2008 | Katsura et al. | 359/457 |
| 2009/0040605 A1 * | 2/2009 | Katsura et al. | 359/457 |

FOREIGN PATENT DOCUMENTS

| | | |
|---|---|---|
| JP | A-10-311906 | 11/1998 |
| JP | A-11-38209 | 2/1999 |
| JP | A-2000-66307 | 3/2000 |
| JP | A-2000-180612 | 6/2000 |
| JP | A-2000-347009 | 12/2000 |
| JP | A-2003-57416 | 2/2003 |
| JP | A-2003-066206 | 3/2003 |
| JP | A-2004-086187 | 3/2004 |

* cited by examiner

SIDE CUT PREVIOUSLY ← ← ← SIDE CUT SUBSEQUENTLY

DIFFUSION SHEET, REAR PROJECTION SCREEN PROVIDED WITH DIFFUSION SHEET, METHOD OF MANUFACTURING MOLD FOR DIFFUSION SHEET, AND METHOD OF MANUFACTURING DIFFUSION SHEET

This is a Divisional of application Ser. No. 10/518,305 filed Dec. 17, 2004, which is a National Phase of Application No. PCT/JP2004/004202 filed Mar. 25, 2004, which claims the benefit of Japanese Patent Application No. 2003-82693 filed Mar. 25, 2003 and Japanese Patent Application No. 2003-119588 filed Apr. 24, 2003. The disclosures of the prior applications are hereby incorporated by reference herein in their entirety.

TECHNICAL FIELD

The present invention relates to a diffusion sheet assembled in a rear projection screen (transmission type screen) and used therein, and more particularly, to a diffusion sheet in which a plurality of approximately trapezoidal columnar unit lens portions (unit optical elements) are disposed, a rear projection screen provided with the diffusion sheet, a method of manufacturing a mold for a diffusion sheet, and a method of manufacturing a diffusion sheet.

BACKGROUND ART

Heretofore, there is known an image display apparatus having a light source and a rear projection screen that projects image light emitted from the light source in enlargement, as a typical image display apparatus represented by a rear projection type television. Further, there is generally known a rear projection screen composed of a Fresnel lens sheet combined with a lenticular lens sheet (diffusion sheet) as the rear projection screen used in the image display apparatus.

The Fresnel lens sheet adjusts image light emitted from a light source to make it to approximate parallel light. There is also a Fresnel lens sheet which collects or diverges light from a light source to a light outgoing side, in addition to the Fresnel lens sheet that adjusts light from the light source to make it to parallel light. In the description, however, explanation is made supposing that light emitted from a Fresnel lens sheet is approximately parallel light.

The lenticular lens sheet causes approximately parallel light adjusted by the Fresnel lens sheet to outgo to an observer as diverged light so that the observer can observe an image on a rear projection screen at various angular positions. More specifically, the lenticular lens sheet diffuses the approximately parallel light outgoing from the Fresnel lens sheet mainly in a horizontal direction as well as also in a vertical direction.

Incidentally, there is known a lenticular lens sheet having a plurality of unit lens portions each having a total reflection surface formed on a part of a side thereof, as the lenticular lens sheet described above. Note that light absorbing portions are formed between the unit lens portions as necessary to prevent the reflection of external light.

More specifically, there is known a lenticular lens sheet having a plurality of unit lens portions disposed thereto, as a first lenticular lens sheet, each of the unit lens portions having a curved surface formed on a light outgoing side vertex and total reflection surfaces formed to a part of side surfaces (refer to Japanese Patent Application Laid-Open Nos. 57-165830, 62-108232, and 60-159733).

Further, there is known a lenticular lens sheet having a plurality of unit lens portions disposed thereto, as a second lenticular lens sheet, each of the unit lens portions having a curved surface formed on a light outgoing side vertex as well as total reflection surfaces formed to a part of side surfaces, and at least two types of unit lens portions, each of which has a different tilt angle of the total reflection surface and a different lens height, being combined as one unit (refer to Japanese Patent Application Laid-Open Nos. 59-140434 and 59-68726).

However, since each unit lens portion of the first and second lenticular lens sheets described above has the curved surface formed on the light outgoing side vertex, a problem arises in that a support sheet cannot be joined to the unit lens portions to support them. Further, a problem also arises in that a lens is liable to be scratched and made dirty because a light outgoing surface of the lenticular lens sheet is formed in an irregular shape due to the curved surfaces of the unit lens portions, and thus the surface thereof cannot be wiped by hand.

Further, since a light absorbing portion cannot be formed to absorb and shield external light in the second lenticular lens sheet described above, the second lenticular lens sheet is disadvantageous in that when an observer views a display, it is difficult for an observer to observe an image because a contrast is low in a bright portion and a dark portion. Further, the second lenticular lens sheet is also disadvantageous in that it is difficult to enhance the resolution of an image by miniaturizing a lenticular lens because the second lenticular lens sheet is formed in a complex shape.

To cope with the above problems, heretofore proposed is a lenticular lens sheet having a plurality of unit lens portions disposed in parallel with each other, each of the unit lens portions having total reflection surfaces formed on the side surfaces of each approximately trapezoidal column, as a third lenticular lens sheet (refer to Japanese Patent Application Laid-Open Publication No. 2002-006112). However, the third lenticular lens sheet has the following problems, which will be explained below in detail.

As shown in FIG. 18A, light, which is emitted from a light source (not shown) and adjusted by a Fresnel lens sheet (not shown) so that it is made to approximately parallel light, is incident on a lenticular lens sheet 700. A part of the light, which is incident on the lenticular lens sheet 700 as described above, travels linearly through the lenticular lens sheet 700 and outgoes therefrom (L2'). However, the other light is reflected on one side of a trapezoidal columnar unit lens portion, refracted on a light outgoing side thereof, and outgoes therefrom (L1'). On the other hand, the other light is also reflected on the other side of the trapezoidal columnar unit lens portion, refracted on the light outgoing side thereof, and outgoes therefrom (L3'). As described above, the light outgoing from trapezoidal columnar unit lens portions disposed to the lenticular lens sheet 700 forms the three groups of light (L1', L2', L3'). Accordingly, when the brightness (gain) of an image formed by the light outgoing from the lenticular lens sheet 700 is measured with respect to a horizontal observation angle, there is obtained a gain curve which has a steep slope with three peaks corresponding to the groups of light (refer to FIG. 18B).

When an observer views an image displayed on a rear projection type television using the lenticular lens sheet 700 arranged as described above from the front of the television, the observer views the central portion of the television with the brightness at the position of 0° in the gain curve. In contrast, the observer views both the right and left ends of the television with the brightness at the positions of ±7.6° in the gain curve when both the ends are viewed at the position five times the height of a screen apart from the television, supposing that the television is a mass-produced television having a screen whose aspect ratio is set to 3:4, although the brightness is different depending on the distance of a position apart from the television where the image is viewed. Accordingly, in the lenticular lens sheet having a distribution of brightness (gain curve) including the steep slope with the three peaks, the observer views an image having bad bright uniformity. When, for example, the observation angles at both the right and left ends of the rear projection type television are approximately in agreement with an angle showing a minimum value of the gain curve, the difference between the brightness in the central portion of the television and the brightness at both the ends thereof extremely increases, thereby the observer views an image having extremely bad bright uniformity.

Further, when the observer views an image on the rear projection type television using the lenticular lens sheet 700 while moving in a horizontal direction from one end of the television to the other end thereof, the observer views the image, which extremely changes in the sequence of "dark, bright, dark, bright, dark, bright, dark" in the central portion of an image surface of the television. At the time, a problem arises in that an image having good bright uniformity cannot be viewed because the bad bright uniformity described above is also added.

Note that when the third lenticular lens sheet as described above is actually manufactured, a metal mold (mold) is used in consideration of mass production. Ordinarily, the metal mold is manufactured by sequentially forming trapezoidal columnar recesses (grooves) corresponding to unit lens portions on a mold material such as a metal substrate and the like by cutting it from an end thereof.

However, when the metal material is cut by the above method, a metal mold 705 is manufactured in such a shape that projections formed between adjacent recesses tilt from the sides of subsequently cut recesses toward the sides of previously cut recesses, as shown in FIG. 19A. When a lenticular lens sheet is manufactured using the metal mold 705 arranged as described above, a side segment, where the recess is formed previously, of the section of each trapezoidal columnar unit lens portion draws a curved line projecting inward, and the other side segment of the section draws a curved line projecting outward as shown in n FIG. 19B. Explained above is the example arranged such that the projections, which are made by forming the recesses for the unit lens portions by cutting the metal material, are deformed (plastically deformed) outward when viewed from the recesses being processed (FIG. 19A). However, there is also a case that a metal mold is manufactured so as to have such as a shape that projections formed to a metal material are deformed (elastically deformed) inward when viewed from recesses being processed, and projections formed between adjacent recesses tilt from the sides of recesses formed previously toward the sides of recesses formed subsequently, adversely to the above case. Note that a lenticular lens sheet 701 having the same shape as that shown in FIG. 19B can be manufactured even by the metal mold manufactured in the latter case.

Note that, when the lenticular lens sheet 701 manufactured as described above is used, a part of light incident thereon after it is adjusted and made to parallel light travels linearly and outgoes therefrom (L1") as shown in FIG. 19B. Further, when the light, which is incident on the lenticular lens sheet 701 as described above, is reflected on the outwardly curved side surface of each trapezoidal columnar unit lens portion, it outgoes mainly at an angle near to a center (L2"), and when the light is reflected on the inwardly projecting side surface, it outgoes mainly at an angle apart from the center (L3"). As a result, a gain curve of the lenticular lens sheet 701, which shows the brightness (gain) of an image to a horizontal observation angle, is a right/left asymmetrical curve as shown in FIG. 19C. Note that the terms "right" and "left" used here correspond to "right" and "left" when the lenticular lens sheet 701 is assembled and used in the rear projection screen for the rear projection type television.

When the observer views an image between, for example, the light outgoing angles L1" and L3" in the rear projection type television using the lenticular lens sheet 701, he or she views the image in a dark state. Accordingly, when the observer views the image while moving in a horizontal direction from one end side to the other end side of the rear projection type television using the lenticular lens sheet 701 (while moving from the right side to the left side of FIG. 19B), the image is viewed in the sequence of "dark, bright, dark, bright, dark, bright" at the center of a screen, from which a problem arises in that it is difficult to view the image because irregular brightness is caused in the image. Further, when the observer views the image displayed on the rear projection type television using the lenticular lens sheet 701 from the front, a problem arises in that he or she views the image having a bad right/left balance, that is, bad bright uniformity.

DISCLOSURE OF THE INVENTION

An object of the present invention, which has been made in view of the above points, is to provide a diffusion sheet used by being assembled in a rear projection screen of a rear projection type television, a rear projection screen provided with the diffusion sheet, a method of manufacturing a mold for a diffusion sheet, and a method of manufacturing the diffusion sheet, the diffusion sheet being capable of presenting an image which has good bright uniformity in an image surface when it is viewed from the front, and further which has less variable brightness as well as good bright uniformity and good distribution of brightness in the image surface even if an observer views the image while moving in a horizontal direction.

The present invention provides, as a first solving means, a diffusion sheet that diffuses light incident thereon from a light incident side and causes the light to outgo from a light outgoing side, the diffusion sheet including: a plurality of approximately trapezoidal columnar unit lens portions disposed such that the long-axis directions thereof are in parallel with each other, wherein all the surfaces of the unit lens portions, which correspond to the long bottom segments of the approximately trapezoidal sections of the unit lens portions vertical to the long-axis directions thereof, are disposed on a light-incident-side flat surface; and a plurality of light absorbing portions interposed between adjacent unit lens portions of the plurality of unit lens portions to absorb external light incident from the light outgoing side, wherein the plurality of unit lens portions are arranged such that a part of the light incident on the unit lens portions from the light incident side is totally reflected on the surfaces of the unit lens portions corresponding to the side segments of the approximately trapezoidal sections of the unit lens portions vertical to the long-axis directions thereof, and the distance between the long bottom segment and the short bottom segment of the approximately trapezoidal section of each of the unit lens portions vertical to the long-axis direction thereof is 120% or more to 400% or less of the length of the long bottom segment.

According to the first solving means of the present invention, the distance between the long bottom segment and the short bottom segment of the approximately trapezoidal section of each of the unit lens portions vertical to the long-axis direction thereof is 120% or more to 400% or less of the length of the long bottom segment. Accordingly, the outgoing direction of the light, which is reflected on the side surfaces (surfaces corresponding to the side segments of the approximately trapezoidal section) acting as the total reflection surfaces, deflects in the direction of light which travels straight in the unit lens portions. As a result, when the gain obtained by the diffusion sheet is measured, a gain curve, which shows brightness (gain) to a viewing angle in a horizontal direction (angle between a viewing direction and the normal direction of the sheet), is a curve which is gentle in its entirety with one peak at a center. Since the diffusion sheet has the above gain curve, when a observer views an image on a rear projection screen, and the like provided with the diffusion sheet from the front of the diffusion sheet, the image has good bright uniformity in an image surface. Further, even if the observer views the image while moving in a horizontal direction, the brightness of a particular part in the image surface does not extremely change and an image excellent bright uniformity can be obtained. Specifically, the observer views the image from the front of the sheet surface, he or she views the brightest image, and the observer views the image becoming gradually darker as he or she moves in the horizontal direction from the point where he or she views the image because the angle between a vertical line to the sheet surface and the line of vision of the observer is increased thereby. However, since the image becomes darker gradually at the time, the observer can easily view the image in a natural state. Further, even if the observer views the image at rest at a position other than the front (however, a position within a viewing angle at which the image can be preferably viewed), the observer can easily view the image in the natural state because no irregular brightness exists in one image surface and he or she can view the image excellent in bright uniformity.

The present invention provides, as a second solving means, a diffusion sheet that diffuses light incident thereon from a light incident side and causes the light to outgo from a light outgoing side, the diffusion sheet including: a plurality of approximately trapezoidal columnar unit lens portions disposed such that the long-axis directions thereof are in parallel with each other, wherein all the surfaces of the unit lens portions, which correspond to the long bottom segments of the approximately trapezoidal sections of the unit lens portions vertical to the long-axis directions thereof, are disposed on a light-incident-side flat surface; and a plurality of light absorbing portions interposed between adjacent unit lens portions of the plurality of unit lens portions to absorb external light incident from the light outgoing side, wherein the plurality of unit lens portions are arranged such that a part of the light incident on the unit lens portions from the light incident side is totally reflected on the surfaces of the unit lens portions corresponding to the side segments of the approximately trapezoidal sections vertical to the long-axis directions of the unit lens portions, and the section of each of the unit lens portions vertical to the long-axis direction thereof is formed in an isosceles trapezoidal shape, and the plurality of unit lens portions have at least two types of unit lens portions each having a different angle between each side segment and the light-incident-side long bottom segment of the isosceles trapezoidal section.

According to the second solving means of the present invention, the section of each of the unit lens portions vertical to the long-axis direction thereof is formed in the isosceles trapezoidal shape, and the diffusion sheet includes at least the two types of the unit lens portions, the isosceles trapezoidal section of each of which has the different angle between each side segment and the light-incident-side long bottom segment thereof. Accordingly, light, which is reflected on the side surfaces acting as the total reflection surfaces (surfaces corresponding to the side segments of the approximately trapezoidal section), outgoes in at least four directions and outgoes in at least five directions in total when light, which travels straight and passes through the diffusion sheet as it is, is taken into consideration. As a result, when the gain obtained by the diffusion sheet is measured, a gain curve, which shows brightness (gain) to a viewing angle in a horizontal direction (angle between a viewing direction and the normal direction of the sheet), has at least five peaks (maximum values) of brightness corresponding to the respective light outgoing directions. Since the bottoms of the peaks overlap, the gain curve is a right/left symmetrical gentle curve having a peak at a center in its entirety. Since the diffusion sheet has the gain curve as described above, when the observer views an image in the front, there is no part in which the image is viewed extremely dark. Further, since the diffusion sheet arranged as described above has a plurality of light outgoing angles, it is possible to increase a viewing angle on the side where the image is viewed. Accordingly, when the observer views the image from the front of a rear projection screen provided with the diffusion sheet, he or she can view the image which is symmetrical on the right side and the left side and has a good distribution of brightness. Further, even if the observer views the image while moving in a horizontal direction, he or she can view the image which less varies in brightness and is excellent in bright uniformity. Further, even if the observer views the image at rest at a position other than the position from the front of the rear projection screen (however, a position within a viewing angle at which the image can be preferably viewed), he or she can view the image excellent in the bright uniformity.

The present invention provides, as a third solving means, a diffusion sheet that diffuses light incident thereon from a light incident side and causes the light to outgo from a light outgoing side, the diffusion sheet including: a plurality of approximately trapezoidal columnar unit lens portions disposed such that the long-axis directions thereof are in parallel with each other, wherein all the surfaces of the unit lens portions, which correspond to the long bottom segments of the approximately trapezoidal sections of the unit lens portions vertical to the long-axis directions thereof, are disposed on a light-incident-side flat surface; and a plurality of light absorbing portions interposed between adjacent unit lens portions of the plurality of unit lens portions to absorb external light incident from the light outgoing side, wherein the plurality of unit lens portions are arranged such that a part of the light incident on the unit lens portions from the light incident side is totally reflected on the surfaces of the unit lens portions corresponding to the side segments of the approximately trapezoidal sections vertical to the long-axis directions of the unit lens portions, and the approximately trapezoidal section of each of the unit lens portions vertical to the long-axis direction thereof has a first angle between one side segment and a light-incident-side long bottom segment, and a second angle between the other side segment and the light-incident-side long bottom segment, the first angle being different from the second angle.

According to the third solving means of the present invention, the first angle between one side segment and the light-incident-side long bottom segment of the approximately trapezoidal section of each of the unit lens portions vertical to the long-axis direction thereof is different from the second angle between the other side segment and the light-incident-side long bottom segment of the section. Accordingly, when the diffusion sheet is arranged such that the bottom angles (angles between the side segments and the long bottom segment) of the parts of adjacent unit lens portions at which they are in contact with each other have the same angle, light, which is reflected on the side surfaces acting as the total reflection surfaces (surfaces corresponding to the side segments of the approximately trapezoidal section), outgoes in at least four directions and outgoes in at least five directions in total when light, which travels straight and passes through the diffusion sheet as it is, is taken into consideration. As a result, when the gain obtained by the diffusion sheet is measured, a gain curve, which shows brightness (gain) to a viewing angle in a horizontal direction (angle between a viewing direction and the normal direction of the sheet), has at least five peaks of brightness corresponding to the respective light outgoing directions. Since the bottoms of the peaks overlap, the gain curve is a gentle curve which is symmetrical on the right side and the left side and has a peak at a center in its entirety. Since the diffusion sheet has the gain curve as described above, when the observer views an image in the front, the image is not viewed in an extremely dark state. Further, since the diffusion sheet arranged as described above has a plurality of light outgoing angles, it is possible to increase a viewing angle on the side where the image is viewed. Accordingly, when the observer views the image from the front of a rear projection screen provided with the diffusion sheet, he or she can view the image which is symmetrical on the right side and the left side and has a good distribution of brightness. Further, even if the observer views the image while moving in a horizontal direction, he or she can view the image which less varies in brightness and is excellent in the bright uniformity. Further, even if the observer views the image at rest at a position other than the position from the front of the rear projection screen (however, a position within a viewing angle at which the image can be preferably viewed), he or she can view the image excellent in the bright uniformity. Furthermore, when the diffusion sheet is arranged as described above, it is possible to simplify the shape of a cutting tool for cutting a mold (metal mold) for the diffusion sheet, thereby a process of manufacturing the cutting tool can be easily arranged.

Note that, in the first to third solving means described above, it is preferable that the length of the light-outgoing-side bottom segment of the section of each of the light absorbing portions vertical to the long-axis direction thereof be 40% or more to 100% or less of the length of the light-incident-side long bottom segment of the section of each of the unit lens portions vertical to the long-axis direction thereof. With this arrangement, since the ratio of the light absorbing portions interposed between the unit lens portions is increased, the contrast of an image can be enhanced, thereby the observer can easily view an image.

Further, in the first to third solving means described above, it is preferable that the section of each of the light absorbing portions vertical to the long-axis direction thereof interposed between adjacent unit lens portions of the plurality of unit lens portions be formed in an approximately triangular shape, and the vertex of the section on the light incident side thereof be composed of a straight line segment having a width of at least 2 μm. In this case, the extreme ends of the projections of the mold which molds a group of the unit lens portions of the diffusion sheets, need not be made steep. Accordingly, the strength of the projections of the mold can be enhanced, thereby the projections of the mold can be prevented from being tilted right and left.

Further, in the first to third solving means described above, it is preferable that the section of each of the light absorbing portions vertical to the long-axis direction thereof interposed between adjacent unit lens portions of the plurality of unit lens portions be formed in an approximately triangular shape, and the vertex of the section on the light incident side thereof be composed of a curved line segment having a radius of curvature of at least 1 μm. In this case, the extreme ends of the projections of the mold which molds a group of the unit lens portions of the diffusion sheets, also need not be made steep. Accordingly, the strength of the projections of the mold for a diffusion sheet can be enhanced, thereby the projections of the mold can be prevented from being tilted right and left.

Further, in the first to third solving means described above, it is preferable that the diffusion sheet further includes a support plate disposed on the light outgoing side of the unit lens portions and containing a diffusion agent. With this arrangement, it is possible to form a layer having other function on the support plate. Further, light outgoing from the unit lens portions and traveling in one direction is diffused by the diffusion agent and can travel in a plurality of directions, thereby the irregular brightness of an image, which changes depending on a position of the observer, can be reduced. Note that, in this case, the peaks (maximum values) of the gain curve described above other than the peak at the center thereof can be eliminated.

Further, in the first to third solving means described above, it is preferable that the light outgoing side surface of the support plate be formed flat. With this arrangement, an image can be displayed on a flat surface, thereby the observer can easily view the image. Further, since the surface of the diffusion sheet is not curved and has no irregularities, the surface can be simply wiped by hand, thereby it is possible to make the surface of the diffusion sheet free from scratches and dusts.

Further, in the first to third solving means described above, it is preferable that the support plate has an ultraviolet ray absorbing action. With this arrangement, ultraviolet rays included in external light can be absorbed by the support plate, thereby a plastic material constituting the unit lens portions, and the like in the diffusion sheet can be prevented from being deteriorated (color change, quality deterioration, and the like).

Further, in the first to third solving means described above, it is preferable that the unit lens portions be composed of a radiation setting resin. With this arrangement, it is possible to obtain a diffusion sheet having unit lens portions molded faithfully to a mold shape.

The present invention provides, as a fourth solving means, a rear projection screen including: the diffusion sheet according to the first to third solving means described above; and a Fresnel lens sheet disposed on the light incident side of the diffusion sheet.

According to the fourth solving means of the present invention, the rear projection screen is composed of the diffusion sheet according to the first to third solving means described above and the Fresnel lens sheet disposed on the light incident side of the diffusion sheet. Accordingly, there can be provided a display on which the observer can view an image easily, the display having no irregular brightness in an image surface and having good bright uniformity therein even if the observer views the image while moving in a horizontal direction or even if the observer views the image at rest at a position from the front of the display or at a position other than the above position (however, a position within a viewing angle at which the image can be preferably viewed).

The present invention provides, as a fifth solving means, a diffusion sheet that diffuses light incident thereon from a light incident side and causes the light to outgo from a light outgoing side, the diffusion sheet including: a plurality of approximately trapezoidal columnar unit lens portions disposed such that the long-axis directions thereof are in parallel with each other, wherein all the surfaces of the unit lens portions, which correspond to the long bottom segments of the approximately trapezoidal sections of the unit lens portions vertical to the long-axis directions thereof, are disposed on a light-incident-side flat surface; and a plurality of light absorbing portions interposed between adjacent unit lens portions of the plurality of unit lens portions to absorb external light incident from the light outgoing side, wherein the plurality of unit lens portions are arranged such that a part of the light incident on the unit lens portions from the light incident side is totally reflected on the surfaces of the unit lens portions corresponding to the side segments of the approximately trapezoidal sections vertical to the long-axis directions of the unit lens portions, and at least one side segment of the approximately trapezoidal section of each of the unit lens portions vertical to the long-axis direction thereof is composed of a curved line segment projecting inward or a curved line segment projecting outward, and the plurality of side segments of the sections of the plurality of unit lens portions include, as a whole, both the side segments each composed of the curved line segment projecting inward and the side segments each composed of the curved line segment projecting outward.

According to the fifth solving means of the present invention, at least one side segment of the approximately trapezoidal section of each of the unit lens portions vertical to the long-axis direction thereof is composed of the curved line segment projecting inward or the curved line segment projecting outward, and the plurality of side segments of the sections of the plurality of unit lens portions include, as a whole, both the side segments each composed of the curved line segment projecting inward and the side segments each composed of the curved line segment projecting outward. Accordingly, light incident from a light source outgoes after it is reflected on the total reflection surfaces having various angles (surfaces corresponding to the respective side segments of the approximately trapezoidal sections). As a result, when the gain obtained by the diffusion sheet is measured, a gain curve, which shows brightness (gain) to a viewing angle in a horizontal direction (angle between a viewing direction and the normal direction of the sheet), is a gentle curve having one peak at a center and expanding in the range of a wide angle in its entirety. Accordingly, when the observer views an image from the front of a rear projection screen provided with the diffusion sheet, he or she can view the image excellent in bright uniformity. Further, even if the observer views the image while moving in a horizontal direction, he or she can view the image which less varies in brightness and is excellent in the bright uniformity. Further, even if the observer views the image at rest at a position other than the position from the front of the rear projection screen (however, a position within a viewing angle at which the image can be preferably viewed), he or she can view the image excellent in the bright uniformity.

In the fifth solving means described above, it is preferable that: the number of the side segments, which are composed of the curved line segments projecting inward, of the sections of the unit lens portions be approximately the same as the number of the side segments, which are composed of the curved line segments projecting outward, of the sections of the unit lens portions in the diffusion sheet as a whole; the number of the unit lens portions whose right side segments are composed of the curved line segments projecting inward be approximately the same as the number of the unit lens portions whose left side segments are composed of the curved line segments projecting inward in the diffusion sheet as a whole; and the number of the unit lens portions whose right side segments are composed of the curved line segments projecting outward be approximately the same as the number of the unit lens portions whose left side segments are composed of the curved line segments projecting outward in the diffusion sheet as a whole. Specifically, it is preferable, for example, that the number of the unit lens portions, which have the side segments composed of the curved line segments projecting inward on the right and left sides, be approximately the same as the number of the unit lens portions, which have the side segments composed of the curved line segments projecting outward on the right and left sides, in the state that the unit lens portions are used. In this case, when the vertical axis of the gain curve showing brightness (gain) with reference to a horizontal viewing direction shows a gain and the lateral line thereof shows a viewing angle (angle between a viewing direction and the normal direction of the sheet), the gain curve is symmetrical on the right side and the left side about a point of origin of the lateral line. Accordingly, there can be viewed an image which has a good balance on the right side and the left side in an image surface and good bright uniformity.

Further, in the fifth solving means described above, it is preferable that the unit lens portions each having the section whose side segments are both composed of the curved line segment projecting inward, and the unit lens portions each having the section whose side segments are both composed of the curved line segment projecting outward be disposed alternately.

Further, in the fifth solving means described above, one side segment of the approximately trapezoidal section of each of the unit lens portions vertical to the long-axis direction thereof may be composed of a curved line segment, and the other side segment thereof may be composed of a straight line segment. In this case, it is preferable that: the number of the side segments, which are composed of the curved line segments projecting inward, of the sections of the unit lens portions be approximately the same as number of the side segments, which are composed of the curved line segments projecting outward, of the sections of the unit lens portions in the diffusion sheet as a whole; the number of the unit lens portions whose right side segments are composed of the curved line segments projecting inward be approximately the same as the number of the unit lens portions whose left side segments are composed of the curved line segments projecting inward in the diffusion sheet as a whole; the number of the unit lens portions whose right side segments are composed of the curved line segments projecting outward be approximately the same as the number of the unit lens portions whose left side segments are composed of the curved line segments projecting outward in the diffusion sheet as a whole; and the number of the unit lens portions whose right side segments are composed of the straight line segments be approximately the same as number of the unit lens portions whose left side segments are composed of the straight lines in the diffusion sheet as a whole.

Further, in the fifth solving means described above, it is preferable that the diffusion sheet further includes a support plate disposed on the light outgoing side of the unit lens portions and containing a diffusion agent. With this arrangement, it is possible to form a layer having other function on the support plate. Further, light outgoing from the unit lens portions and traveling in one direction is diffused by the diffusion agent and can travel in a plurality of directions, thereby the irregular brightness of an image, which changes depending on a position of the observer, can be reduced. Note that, in this case, the maximum values of the gain curve described above other than the peak at the center can be eliminated.

Further, in the fifth solving means described above, it is preferable that the light-outgoing-side surface of the support plate be formed flat. With this arrangement, an image can be displayed on a flat surface, thereby the observer can easily view the image. Further, since the surface of the diffusion sheet is not curved and has no irregularities, the surface can be simply wiped by hand, thereby it is possible to make the surface of the diffusion sheet free from scratches and dusts.

Further, in the fifth solving means described above, it is preferable that the support plate has an ultraviolet ray absorbing action. With this arrangement, ultraviolet rays included in external light can be absorbed by the support plate, thereby a plastic material constituting the unit lens portions, and the like in the diffusion sheet can be prevented from being deteriorated (color change, quality deterioration, and the like).

Further, in the fifth solving means described above, it is preferable that the unit lens portions are composed of a radiation setting resin. With this arrangement, it is possible to obtain a diffusion sheet having unit lens portions molded faithfully to a mold shape.

The present invention provides, as a sixth solving means, a rear projection screen including: the diffusion sheet according to the fifth solving means described above; and a Fresnel lens sheet disposed on the light incident side of the diffusion sheet.

According to the sixth solving means of the present invention, the rear projection screen is composed of the diffusion sheet according to the fifth solving means described above and the Fresnel lens sheet disposed on the light incident side of the diffusion sheet. Accordingly, there can be provided a display on which the observer can view an image easily, the display having no irregular brightness in an image surface, having good bright uniformity therein, and having a good distribution of brightness symmetrical on the right side and left side even if the observer views the image while moving in a horizontal direction or even if the observer views the image at rest at a position from the front of the display or at a position other than the above position (however, a position within a viewing angle at which the image can be preferably viewed).

The present invention provides, as a seventh solving means, a method of manufacturing a mold for a diffusion sheet in which a plurality of approximately trapezoidal columnar unit lens portions are disposed such that the long-axis directions thereof are in parallel with each other, and all the surfaces of the unit lens portions, which correspond to the long bottom segments of the approximately trapezoidal sections of the unit lens portions vertical to the long-axis directions thereof, are disposed on a light-incident-side flat surface, the method including: a first step of cutting a material of the mold for the diffusion sheet to form a plurality of trapezoidal columnar recesses for unit lens portions with the material remaining spaces for trapezoidal columnar recesses for one or more adjacent unit lens portions on the material; and a second step of cutting the remaining spaces of the material to form the trapezoidal columnar recesses for the adjacent unit lens portions after the completion of the first step.

According to the seventh solving means of the present invention, after the material of the mold for the diffusion sheet is cut and a plurality of trapezoidal columnar recesses for unit lens portions are formed thereto remaining spaces for recesses for one or more adjacent unit lens portions in the material, the remaining spaces of the material are cut and recesses for unit lens portions are formed afterward. Accordingly, the projections located on both the sides or one side of the recesses formed afterward naturally tilt outward thereof (on the sides of the recesses having been formed) or inward thereof. As a result, there can be manufactured a mold in which the numbers of the projections that tilt right and left are approximately the same as a whole when the mold is used.

The present invention provides, as an eight solving means, a method of manufacturing a mold for a diffusion sheet in which a plurality of approximately trapezoidal columnar unit lens portions are disposed such that the long-axis directions thereof are in parallel with each other, and all the surfaces of the unit lens portions, which correspond to the long bottom segments of the approximately trapezoidal sections of the unit lens portions, are disposed on a light-incident-side flat surface, the method including: a first step of cutting a material of a master mold for the diffusion sheet to form a plurality of trapezoidal columnar recesses for unit lens portions with the material remaining spaces for trapezoidal columnar recesses for one or more adjacent unit lens portions on the material; a second step of manufacturing the master mold for the diffusion sheet by cutting the remaining spaces of the material to form the trapezoidal columnar recesses for the adjacent unit lens portions after the completion of the first step; and a third step of obtaining the mold for the diffusion sheet by copying the master mold for the diffusion sheet manufactured at the second step.

According to the eight solving means of the present invention, after the material of the master mold for the diffusion sheet is cut and a plurality of trapezoidal columnar recesses for unit lens portions are formed thereto remaining spaces for recesses for one or more adjacent unit lens portions in the material, the remaining spaces of the material are cut and recesses for unit lens portions are formed afterward. Accordingly, the master mold for the diffusion sheet having the same shape as that of the mode for the diffusion sheet described above can be manufactured. Then, there can be manufactured a mold for the diffusion sheet which achieves the same operation/working effect as that of the mold for the diffusion sheet according to the seventh solving means described above by copying the thus manufactured master mold for the diffusion sheet.

The present invention provides, as a ninth solving means, a method of manufacturing a diffusion sheet including the steps of: preparing a mold for the diffusion sheet manufactured by the method according to the seventh solving means described above; coating a liquid resin for unit lens portions in the recesses of the mold for the diffusion sheet so that it is buried in the recesses; setting the liquid resin buried in the recesses of the mold for the diffusion sheet; and obtaining the diffusion sheet in which a plurality of approximately trapezoidal columnar unit lens portions are disposed, by removing the liquid resin from the mold for the diffusion sheet after it is set.

According to the ninth solving means, the diffusion sheet is manufactured using the mold for the diffusion sheet manufactured by the method of the seventh solving means described above. Accordingly, there can be obtained a diffusion sheet including unit lens portions in which the number of the side segments, which are composed of curved line segments projecting inward, of the section of each unit lens portion is approximately the same as the number of the side segments which are composed of curved line segments projecting inward, and the number of the curved line segments projecting outward is approximately the same as the number of the curved line segments projecting outward in terms of the right and left side segments. The gain curve of the diffusion sheet obtained as described above is a gentle curve having a peak at a center and expanding in the range of a wide angle in its entirety. As a result, when the observer views an image from the front of a rear projection screen provided with the diffusion sheet, he or she can view the image which has a good right/left balance of brightness and is excellent in bright uniformity. Further, even if the observer views the image while moving in a horizontal direction, he or she can view the image which less varies in brightness and is excellent in the bright uniformity. Further, even if the observer views the image at rest at a position other than the position from the front of the rear projection screen (however, a position within a viewing angle at which the image can be preferably viewed), he or she can view the image excellent in the bright uniformity.

The present invention provides, as a tenth solving means, a method of manufacturing a diffusion sheet including the steps of: preparing a mold for the diffusion sheet manufactured by the method according to the eight solving means described above, coating a liquid resin for unit lens portions in the recesses of the mold for the diffusion sheet so that it is buried in the recesses; setting the liquid resin buried in the recesses of the mold for the diffusion sheet; and obtaining the diffusion sheet in which a plurality of approximately trapezoidal columnar unit lens portions are disposed, by removing the liquid resin from the mold for the diffusion sheet after it is set.

According to the tenth solving means of the present invention, since a diffusion sheet is manufactured using the mold for the diffusion sheet manufactured according to the eight solving means, there can be manufactured a diffusion sheet which achieves the same operation/working effect as that of the diffusion sheet according to the fifth solving means described above likewise the ninth solving means described above.

EMBODIMENTS FOR CARRYING OUT THE INVENTION

Embodiments of the present invention will be explained with reference to the drawings.

Diffusion Sheet According to First Embodiment

First, a diffusion sheet according to a first embodiment of the present invention will be explained with reference to FIGS. 1, 2, 3A, and 3B. Note that the terms "right" and "left" used in the following explanation correspond to "right" and "left" when the diffusion sheet is assembled and used in a rear projection screen for a rear projection type television.

Figure 1:
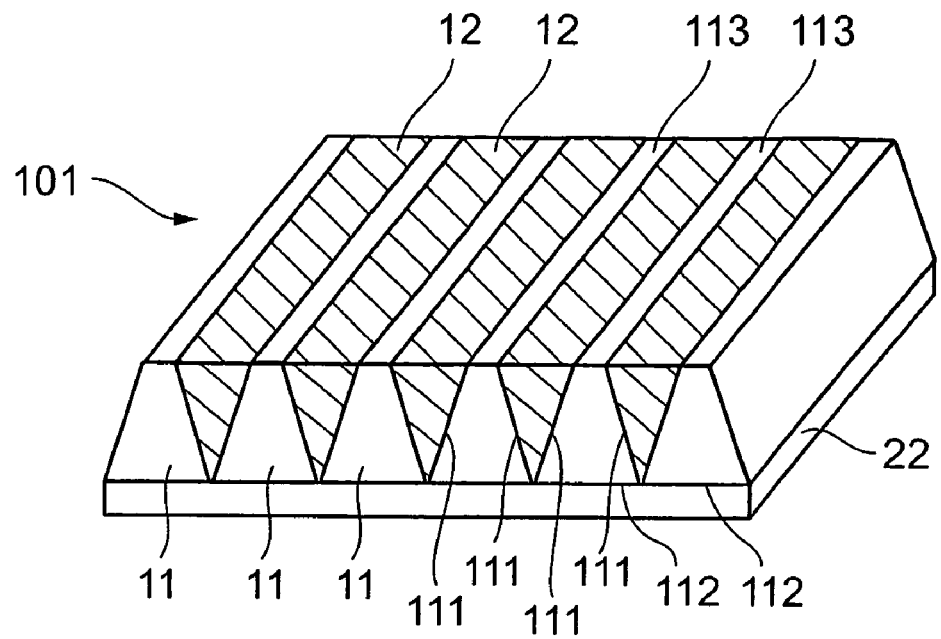
FIG. 1 is a perspective view showing an example of a diffusion sheet according to a first embodiment of the present invention.
Figure 2:
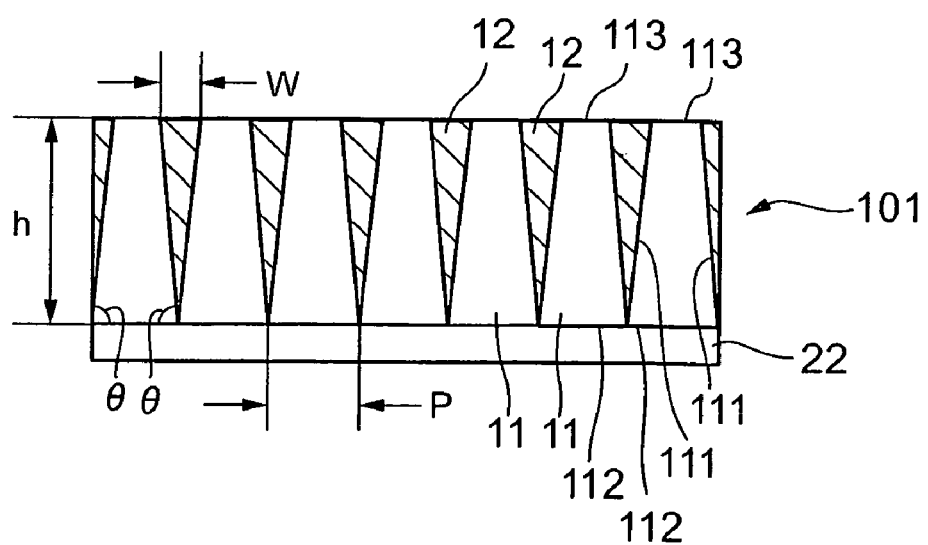
FIG. 2 is a sectional view showing the diffusion sheet shown in FIG. 1 in detail.

As shown in FIG. 1, the diffusion sheet 101 according to the first embodiment of the present invention has a plurality of unit lens portions 11 formed in an approximately trapezoidal columnar shape. As shown in FIGS. 1 and 2, each unit lens portion 11 has a horizontal section (surface obtained by cutting the unit lens portion 11 vertically with respect to the long-axis direction thereof) formed in an approximately trapezoidal shape, and has surfaces (side surfaces 111) corresponding to the side segments of the section, a lower bottom surface (light incident surface 112) corresponding to the long bottom segment of the section and an upper bottom surface (light outgoing surface 113) corresponding to the short bottom segment of the section. In the trapezoidal section, both the bottom surfaces (that is, the upper and lower bottom surfaces) thereof are formed in parallel with each other. Further, although there may be a case that the sections of the unit lens portions 11 are not formed in an accurate trapezoidal shape, explanation will be made in the description supposing that they are formed in the trapezoidal shape for the purpose of convenience. Note that each unit lens portion 11 is also called a lenticular lens, and the diffusion sheet 101 is also called a lenticular lens sheet.

The unit lens portions 11 are continuously disposed on a transparent resin film substrate 22 so that the long axes thereof are in parallel with each other. At the time, the unit lens portions 11 are disposed such that all the large surfaces (light incident surfaces 112 in FIG. 1) of the upper bottom surfaces and the lower bottom surfaces of the unit lens portions 11 are located on a light-incident-side flat surface (on the surface of the transparent resin film substrate 22).

Further, a plurality of approximately triangle columnar light absorbing portions 12 are interposed between adjacent unit lens portions 11 to absorb external light incident from a light outgoing side. Note that the light absorbing portions 12 are also called black stripes.

Image light emitted from a light source (not shown) is incident on the diffusion sheet 101 arranged as described above from the light incident surfaces 112 of the unit lens portions 11 and outgoes from the light outgoing surfaces 113 thereof after it passes through the unit lens portions 11.

The unit lens portions 11 have the side surfaces 111 acting as boundaries between the unit lens portions 11 and the light absorbing portions 12 so that a part of light incident on the unit lens portions 11 from the light incident sides thereof is totally reflected on the side surfaces 111. Accordingly, the refractive index n1 of the unit lens portion 11 and the refractive index n2 of the light absorbing portion 12 must satisfy a relation of n1>n2, and thus the materials constituting the respective parts of the unit lens portions 11 and the light absorbing portions 12 are selected to satisfy the above relation.

Note that the material of the unit lens portions 11 is not particularly limited as long as it satisfies the relation between the refractive indices n1 and n2, and a resin and the like that are conventionally used as the material of the lenticular lens can be used. Specifically, a radiation-setting type resin, a thermoplastic resin, and the like are exemplified. Among them, when the radiation-setting resin is used, it is possible to mold the unit lens portions 11 faithfully to a mold shape.

In contrast, the light absorbing portions 12 prevent the reflection of external light by absorbing and/or shielding external light, which is incident from the light outgoing side, and external light, which is incident on the unit lens portions 11 from the light outgoing surfaces 113 thereof and reaches the side surfaces 111. The above function of the light absorbing portions 12 prevents the deterioration of contrast of an image to be viewed.

Note that, the material of the light absorbing portions 12 is not particularly limited as long as it satisfies the relation between the refractive indices n1 and n2, and a low refractive index acrylate resin, and the like to which, silicon, fluorine are introduced is used. Further, the light absorbing portions 12 may be added with light absorbing particles to absorb and/or to shield external light. Exemplified as the light absorbing particles are, for example, pigments such as carbon, and the like, a plurality of dyes of red, blue, yellow, black, and the like or acrylic cross-linked particles colored with the pigments and/or the dyes, and the like.

Although the size of the diffusion sheet 101 arranged as described above is not particularly limited, it is ordinarily preferable that the size be about (50 cm long)×(70 cm wide)×(0.1 cm thick) to about (150 cm long)×(200 cm wide)×(0.5 cm thick). Further, although the size of each unit lens portion 11 is not particularly limited, it is ordinarily preferable that the width of the light incident surface 112 be 50 to 80 μm, the distance between the light incident surface 112 and the light outgoing surface 113 (lens height) be 100 to 170 μm, and the length in the long-axis direction be 50 to 150 cm. It is possible to enhance the resolution of an image by miniaturizing the size of each unit lens portion 11 as described above.

The diffusion sheet 101 arranged as described above will be explained below in detail with reference to FIGS. 2, 3A, and 3B.

As shown in FIG. 2, in the diffusion sheet 101, the distance (distance between the light incident surface 112 and the light outgoing surface 113) h between both the bottom segments (long bottom segment and short bottom segment) of the approximately trapezoidal section of each unit lens portion 11 is 120% or more to 400% or less of the length p of the long bottom segment (light incident surface 112). The distance h between both the bottom segments is preferably 200% or more to 400% or less of the length p of the long bottom segment (light incident surface 112), more preferably 200% or more to 250% or less of it, and most preferably 200% or more to 230% or less of it. It is possible to stop down the outgoing direction of light from the unit lens portions 11 of the diffusion sheet 101 as well as to easily absorb external light by the light absorbing portions 12 by setting the value of h/p within the above range. Note that the upper limit value of h/p is set to 400% described above because an increase in the value of h/p deteriorates the removing property of the diffusion sheet 101 when it is removed from a mold after it is molded as well as makes it difficult to manufacture the mold for molding the diffusion sheet 101. The length p of the long bottom segment (light incident surface 112) of the unit lens portions 11 is also called a pitch. Further, the distance h between both the bottom segments (light incident surface 112 and light outgoing surface 113) is also called the lens height.

In the diffusion sheet 101, it is preferable that the length w of the light outgoing side bottom segment of the approximately triangular section of each light absorbing portion 12 be 40% or more to 100% or less of the length p of the long bottom segment (light incident surface 112) of the approximately trapezoidal section of each unit lens portion 11. The length w is preferably 55% or more to 100% or less of the length p of the long bottom segment (light incident surface 112) of the unit lens portion 11, more preferably 55% or more to 70% or less of it, and most preferably 55% or more to 65% or less of it. Since the ratio of the light absorbing portions 12 interposed between the unit lens portions 11 is increased by setting the value of w/p within the above range, the contrast of an image can be enhanced, which permits the observer to easily view the image. Further, setting the value of w/p within the above range can excellently suppress the reflection of external light such as illumination in a room, and the like on a screen.

Further, in the diffusion sheet 101, although the angle θ between the long bottom segment (light incident surface 112) and the side segments (side surfaces 111 acting as the total reflection surfaces) of the approximately trapezoidal section of each unit lens portion 11 is not particularly limited, it is about 75° to 89°, and preferably about 80° to 84°.

Figure 3A:
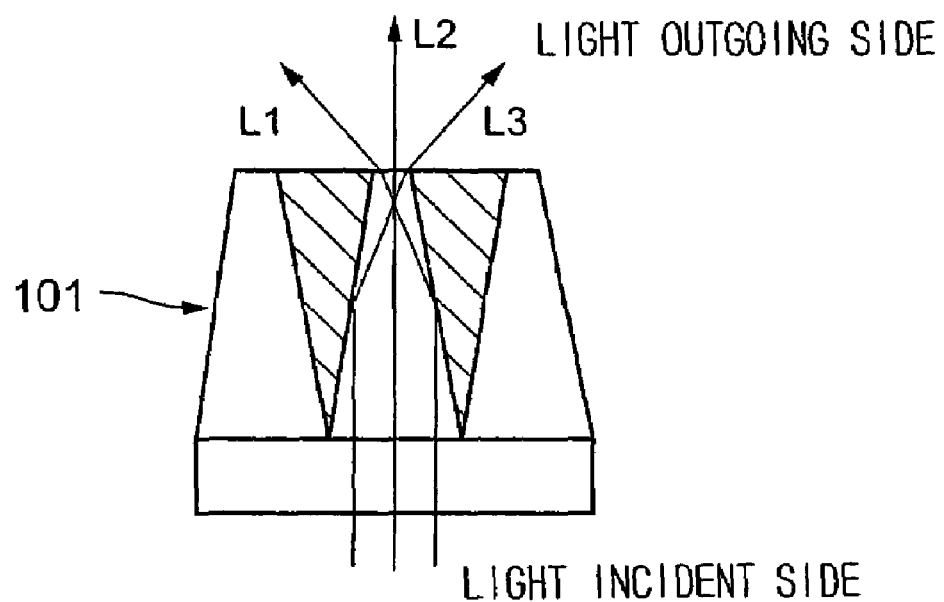
FIG. 3A is a sectional view showing a light traveling direction in the diffusion sheet shown in FIGS. 1 and 2.
Figure 3B:
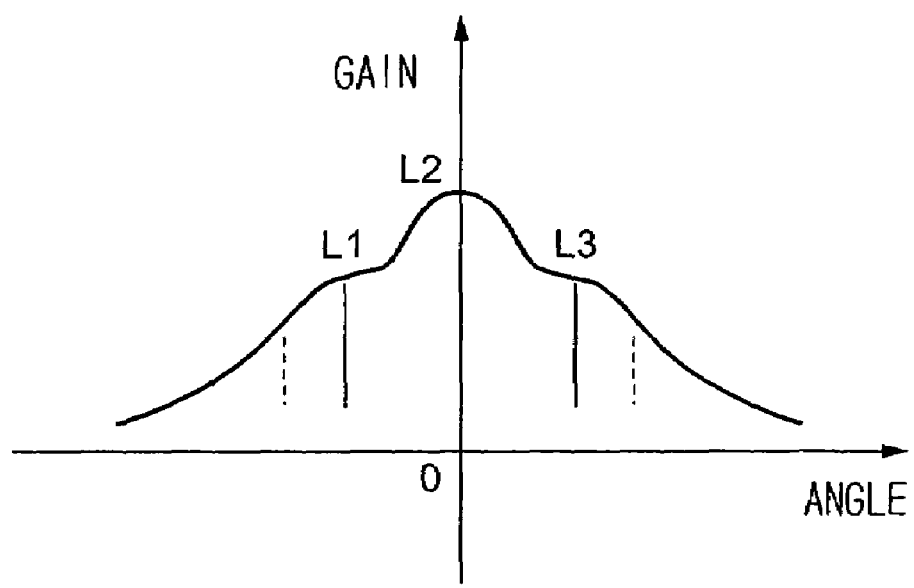
FIG. 3B is a graph showing the relation (gain curve) between a viewing position (angle) and the brightness of an image (gain) in the diffusion sheet shown in FIG. 3A.

According to the diffusion sheet 101 arranged as described above, the light from the unit lens portions 11 of the diffusion sheet 101 outgoes mainly in three directions as shown in FIG. 3A. Note that the three directions described here is a sum of one direction (L2) in which the light travels straight without being reflected on the side surfaces 111 of the unit lens portions 11 and two directions (L1, L3) in which the light travels right and left at the angle near to the center after it is reflected on the side surfaces 111.

In the diffusion sheet 101 according to the first embodiment of the present invention, since the side surfaces 111 of the unit lens portions 11 have a steep angle with respect to the light incident surfaces 112 as shown in FIGS. 2 and 3A, light reflected on the side surfaces 111 outgoes at the angle near to the center. Accordingly, when the gain obtained by the diffusion sheet 101 is measured, a gain curve, which shows brightness (gain) to a viewing angle in a horizontal direction (angle between a viewing direction and the normal direction of the sheet), is a curve which is gentle in its entirety with one peak at a center as shown in FIG. 3B. As described above, the diffusion sheet 101 has no large minimum value in the gain curve. Accordingly, when the observer views an image from a light source (not shown) from the side of the light outgoing surfaces 113 of the unit lens portions 11 on a rear projection screen, and the like provided with the diffusion sheet 101, the image is brightest when the observer views it from the front of the sheet, and the image gradually becomes darker as the angle between a normal to the sheet and a visual line increases. Accordingly, even if the observer moves in a horizontal direction, he or she does not view the image in extremely different brightness, thereby the observer can easily view the image in a natural state. Further, even if the observer views the image at rest, there is no irregular brightness in one image surface, and he or she can view the image excellent in bright uniformity, thereby the observer can easily view the image in the natural state.

(Method of Manufacturing Diffusion Sheet)

Next, a method of manufacturing the diffusion sheet 101 according to the first embodiment of the present invention will be explained.

First, a mold (metal mold) for a diffusion sheet is prepared to mold the approximately trapezoidal columnar unit lens portions 11. The mold is manufactured by sequentially forming approximately trapezoidal columnar recesses corresponding to the unit lens portions 11 on a mold material by cutting it. The mold may be formed in a flat shape or in a roll shape. Among them, when the roll-shaped mold is manufactured, a roll-shaped mold material composed of a soft metal, and the like is mounted on a lathe, and the approximately trapezoidal columnar recesses are sequentially formed by cutting the mold material with a cutting tool, and the like while turning the mold material.

Next, although the diffusion sheet is manufactured using the mold for a diffusion sheet manufactured as described above, there are three types of methods as specific methods of molding the diffusion sheet.

A molding method using the roll-shaped mold will be explained as a first molding method. In this case, a PET film acting as a transparent film substrate 22 of the diffusion sheet 101 is caused to pass between the roll-shaped mold fixed on a rotatable shaft and a roller as well as a liquid resin (ultraviolet-ray setting resin), which is composed of the material described above and forms the unit lens portions 11, is flown between the PET film and the roll-shaped mold. The resin is caused to pass along the roll-shaped mold together with the PET film and molded in the shape of the plurality of unit lens portions 11. After the PET film and the resin are caused to pass between the roll-shaped mold and the roller, ultraviolet rays are illuminated onto the resin on the PET film to thereby set the resin. Thereafter, a sheet composed of the set resin and the PET film is removed from the roll-shaped mold. The main portion of the diffusion sheet 101 is formed by continuously executing the above process.

A molding method using the flat-shaped mold will be explained as a second molding method. In this case, the liquid resin (ultraviolet-ray setting resin), which is composed of the material described above and forms the unit lens portions 11, is applied (coated) on the flat-shaped mold so that it is buried therein, the PET film acting as the transparent resin film substrate 22 is placed on the resin and pressed, and then ultraviolet-rays are illuminated onto the resin to thereby set the resin. Thereafter, a sheet composed of the set resin and the PET film is removed from the mold, thereby the main portion of the diffusion sheet 101 is formed.

A molding method using the flat-shaped mold will be explained as a third molding method. In this case, a sheet composed of a PET film and a resin disposed on the PET film is placed on the flat-shaped mold, the PET film acting as the transparent resin film substrate 22 and having a thickness of about 30 to 200 μm, and the resin being composed of the material described above and forming the unit lens portions 11. Next, the resin on the PET film is formed by the flat-shaped mold so that it is molded and made to the approximately trapezoidal columnar unit lens portions 11. Finally, the thus obtained sheet is removed from the mold, thereby the main portion of the diffusion sheet 101 is molded.

Thereafter, the material (black resin) for the light absorbing portions 12 described above is applied (coated) in the grooves formed between the unit lens portions 11 of the sheet that is removed from the mold by any of the first to third molding methods, thereby the light absorbing portions 12 are formed. The diffusion sheet 101 according to the first embodiment of the present invention is manufactured by the methods described above.

Note that, in the first embodiment described above, the horizontal section of each of the unit lens portions 11 constituting the diffusion sheet 101 is formed in an isosceles trapezoidal shape as shown in FIGS. 2 and 3A. However, the shape of the section is not limited to the isosceles trapezoidal shape, and the section may be formed in various trapezoidal shapes as described later (refer to FIGS. 4A, 5, 6, and 7).

Diffusion Sheet According to Second Embodiment

Next, a diffusion sheet according to a second embodiment of the present invention will be explained with reference to FIGS. 4A and 4B. The basic arrangement of the diffusion sheet according to the second embodiment of the present invention is approximately the same as that of the first embodiment shown in FIGS. 1, 2, 3A, and 3B except that the diffusion sheet includes at least two types of unit lens portions, which have a different angle between each side segment and a light-incident-side long bottom segment of an isosceles trapezoidal section, as a plurality of unit lens portions. In the second embodiment shown in FIGS. 4A and 4B, the same portions as those of the first embodiment shown in FIGS. 1, 2, 3A, and 3B are denoted by the same reference numerals and the detailed description of them is omitted.

Figure 4A:
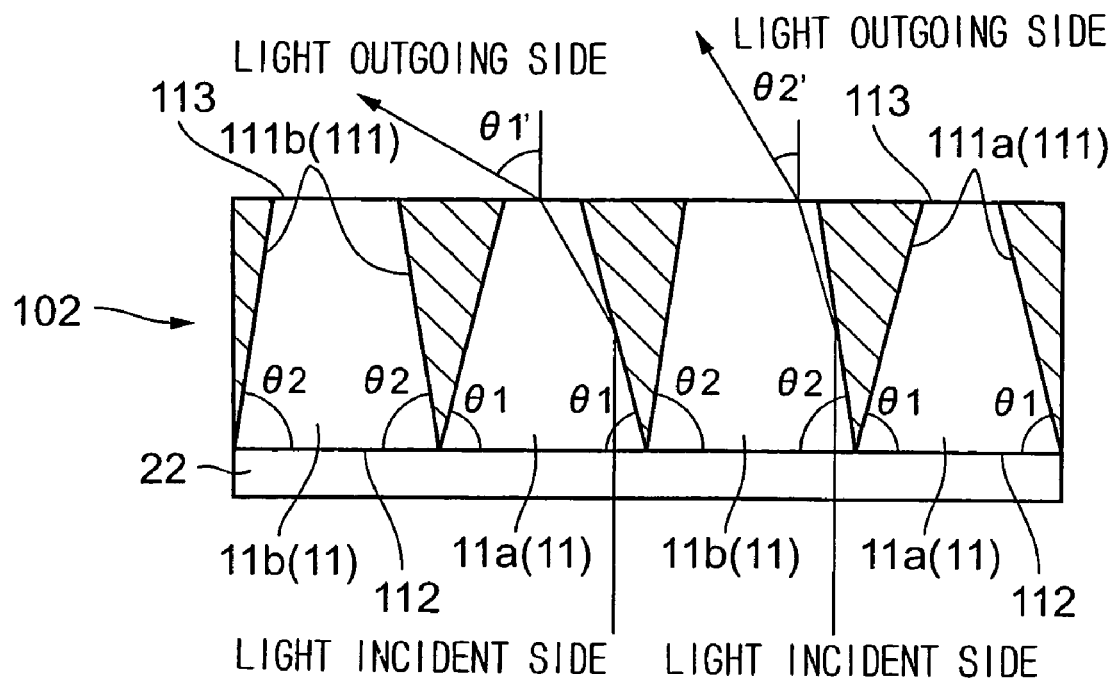
FIG. 4A is a sectional view showing an example of a diffusion sheet according to a second embodiment of the present invention.
Figure 4B:
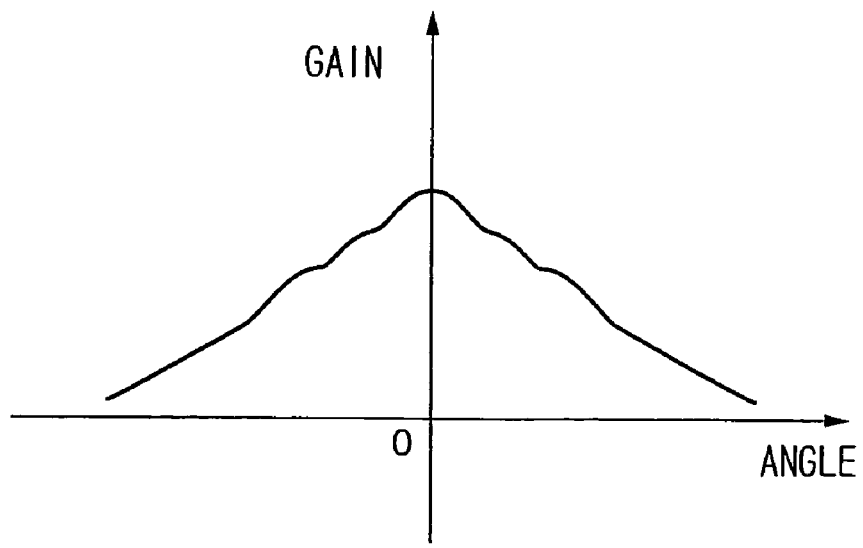
FIG. 4B is a graph showing the relation (gain curve) between a viewing position (angle) and the brightness of an image (gain) in the diffusion sheet shown in FIG. 4A.

As shown in FIG. 4A, the diffusion sheet 102 according to the second embodiment of the present invention has a plurality of unit lens portions 11 formed in an approximately trapezoidal columnar shape. The horizontal section of each of the unit lens portions 11 (surface cut vertically with respect to the long-axis direction of the unit lens portion 11) is formed in an isosceles trapezoidal shape. The plurality of unit lens portions 11 include at least two types of unit lens portions 11a and 11b which have a different angle between side surfaces 111, which correspond to the side segments of the unit lens portions 11 and act as total reflection surfaces, and the light incident surfaces 112 corresponding to the long bottom segments of the unit lens portions 11. Specifically, the unit lens portions 11 includes the unit lens portions 11a in which the angle between side surfaces 111a and light incident surfaces 112 is set to $\theta 1$ and unit lens portions 11b in which the angle between side surfaces 111b and light incident surfaces 112 is set to $\theta 2$ different from $\theta 1$. These unit lens portions 11a and 11b are alternately disposed on a transparent resin film substrate 22.

According to the diffusion sheet 102 arranged as described above, the light reflected on the side surfaces 111a and 111b of the unit lens portions 11a and 11b travels at different angles ($\theta 1'$ and $\theta 2'$) as shown in FIG. 4A. As a result, the light passing through the unit lens portions 11a and 11b outgoes in at least four directions, and outgoes in five directions in total when light, which travels straight and passes through the diffusion sheet 102 as it is, is taken into consideration. Accordingly, when the gain obtained by the diffusion sheet 102 is measured, a gain curve, which shows brightness (gain) to a viewing angle in a horizontal direction (angle between a viewing direction and the normal direction of the sheet), has at least five peaks (maximum values) of brightness corresponding to the respective light outgoing directions, as shown in FIG. 4B. Since the bottoms of the peaks overlap, the gain curve is a right/left symmetrical gentle curve having a peak at a center in its entirety. As described above, since the gain curve of the diffusion sheet 102 has no large minimum value, when an observer views an image from a light source (not shown) from the side of the light outgoing surfaces 113 of the unit lens portions 11 in a rear projection screen, and the like provided with the diffusion sheet 102, a part of the image where it is viewed in an extremely dark state is eliminated. Further, the diffusion sheet 102 arranged as described above has a plurality of light outgoing angles, it is possible to increase a viewing angle on the side where the image is viewed. Accordingly, when the observer views the image from the front of the rear projection screen, and the like provided with the diffusion sheet 102, he or she can view the image which is symmetrical on the right side and the left side and has a good distribution of brightness. Further, even if the observer views the image while moving in a horizontal direction, he or she can view the image which less varies in brightness and is excellent in bright uniformity. Further, even if the observer views the image at rest at a position other than the position in the front of the rear projection screen (however, a position within a viewing angle at which the image can be preferably viewed), he or she can view the image excellent in the bright uniformity.

It should be noted that, in the second embodiment described above, there are alternately disposed at least the two types of the unit lens portions 11a and 11b which have the different angles ($\theta 1$, $\theta 2$) between the side surfaces 111 corresponding to the side segments and the light incident surfaces 112 corresponding to the long bottom segments. However, the manner of disposing the unit lens portions 11a and 11b is not limited to the above, and they may be periodically disposed in a predetermined set of unit lens portions 11a and 11b, for example, two unit lens portions 11a, two unit lens portions 11b, two unit lens portions 11a, two unit lens portions 11b, or they may be disposed at random. Further, there may be used and disposed at least three types of the unit lens portions each having a different angle between the side surfaces 111 corresponding to the side segments and the light incident surfaces 112 corresponding to the long bottom segments in any arbitrary mode as described above.

Further, in the second embodiment described above, the horizontal section of each of the unit lens portions 11a and 11b (11) constituting the diffusion sheet 102 is formed in the isosceles trapezoidal shape as shown in FIG. 4A. However, the shape of the horizontal section is not limited thereto and may be formed in various trapezoidal shapes (FIGS. 6 and 7) described below. When the side surfaces 111 of the unit lens portions 11 are formed in a curved surface as shown in FIG. 7, the average angle between each side surface 111 and the light incident surface 112 of each unit lens portion 11 corresponds to the angles $\theta 1$ and $\theta 2$ in the diffusion sheet 102 shown in FIG. 4A. Note that, when the side surface 111 is the curved surface, the average angle is the value obtained by measuring the angle (acute angle) between the straight line connecting both the ends of the side surfaces 111 and the light incident surface 112.

Diffusion Sheet According to Third Embodiment

Next, a diffusion sheet according to a third embodiment of the present invention will be explained with reference to FIG. 5. The basic arrangement of the diffusion sheet according to the third embodiment of the present invention is approximately the same as that of the first embodiment shown in FIGS. 1, 2, 3A, and 3B except that each of unit lens portions, which are used as a plurality of unit lens portions in the third embodiment, has a first angle between one side segment and a light-incident-side long bottom segment and a second angle, which is different from the first angle, between the other side segment and the long bottom segment in an approximately trapezoidal section. In the third embodiment shown in FIG. 5, the same portions as those of the first embodiment shown in FIGS. 1, 2, 3A, and 3B are denoted by the same reference numerals and the detailed description of them is omitted.

Figure 5:
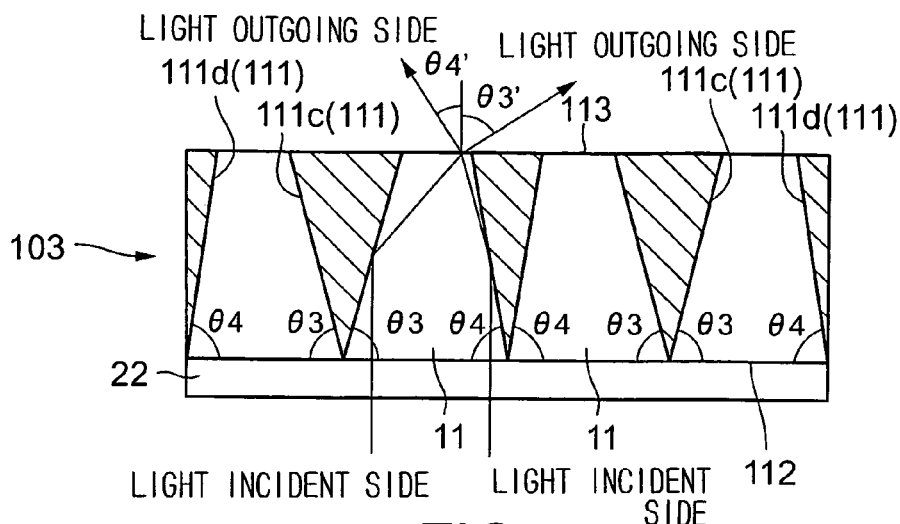
FIG. 5 is a sectional view showing an example of a diffusion sheet according to a third embodiment of the present invention.

As shown in FIG. 5, a diffusion sheet 103 according to the third embodiment of the present invention has the plurality of unit lens portions 11 formed in an approximately trapezoidal columnar shape.

The horizontal section of each of the unit lens portions 11 (surface cut vertically with respect to the long-axis direction of the unit lens portion 11) is formed in an nonisosceles trapezoidal shape. Specifically, in the horizontal section of each unit lens portion 11, the first angle $\theta 3$ between a side surface 111c corresponding to one side segment and a light incident surface 112 corresponding to a long bottom segment is different from the second angle $\theta 4$ between a side surface 111d corresponding to the other side segment and the light incident surface 112 corresponding to the long bottom segment. The plurality of unit lens portions 11 each having the two types of the angles ($\theta 3$, $\theta 4$) are disposed on a transparent resin film substrate 22 in such a manner that the surfaces, which correspond to the side segments having the angle $\theta 3$, of adjacent unit lens portions 11 are disposed adjacent to each other, and the surfaces, which correspond to the side segments having the angle $\theta 4$, of adjacent unit lens portions 11 are disposed adjacent to each other.

According to the diffusion sheet 103 arranged as described above, light reflected on the side surfaces 111c and 111d of each unit lens portion 11 travels at the different angles ($\theta 3'$ and $\theta 4'$) as shown in FIG. 5. As a result, the light passing through each unit lens portion 11 outgoes in at least four direction, and outgoes in at least five directions in total when light, which travels straight and passes through the diffusion sheet 103 as it is, is taken into consideration. Accordingly, when the gain obtained by the diffusion sheet 103 is measured, a gain curve similar to that of the second embodiment described above is obtained (refer to FIG. 4B). As described above, since the gain curve of the diffusion sheet 103 has no large minimum value, when an observer views an image from a light source (not shown) from the side of the light outgoing surface 113 of the unit lens portions 11, a part of the image where it is viewed in an extremely dark state is eliminated. Further, the diffusion sheet 103 arranged as described above has the plurality of light outgoing angles, it is possible to increase a viewing angle on the side where the image is viewed. Accordingly, when the observer views the image from the front of the rear projection screen, and the like provided with the diffusion sheet 103, he or she can view the image which is right/left symmetrical and has a good distribution of brightness. Further, even if the observer views the image while moving in a horizontal direction, he or she can view the image which less varies in brightness and is excellent in bright uniformity. Further, even if the observer views the image at rest at a position other than the position in the front of the rear projection screen (however, a position within a viewing angle at which the image can be preferably viewed), he or she can view the image excellent in the bright uniformity. Further, when the diffusion sheet 103 as shown in FIG. 5 is molded, it is possible to simplify the shape of a cutting tool for cutting a mold for the diffusion sheet, thereby the cutting tool can be easily manufactured. Further, the mold and the cutting tool are less broken due to the insufficient strength of the cutting tool. A mold having a sufficient strength can be safely cut and manufactured by forming the diffusion sheet 103 in the shape described above.

It should be noted that, in the third embodiment described above, the plurality of unit lens portions 11 each having the two types of the angles ($\theta 3$ and $\theta 4$) are disposed in such a manner that the surfaces, which correspond to the segments having the angle $\theta 3$, of adjacent unit lens portions 11 are disposed adjacent to each other, and the surfaces, which correspond to the segments having the angle $\theta 4$, of adjacent unit lens portions 11 are disposed adjacent to each other. However, the manner of disposing the unit lens portions 11 is not limited to the above manner, and they can be disposed in any arbitrary manner. Specifically, it is also possible, for example, to further combine and dispose other type of unit lens portions in each of which the angles between the side surfaces 111 and the light incident surface 112 are different from the angles described above ($\theta 3$ and $\theta 4$). However, even if a diffusion sheet having a shape different from that of the diffusion sheet 103 shown in FIG. 5 is used, it is preferable to employ a mode of the unit lens portions and a manner of disposing them such that an image having right/left symmetrical brightness can be obtained when an image surface is viewed in its entirety from the front of the diffusion sheet.

Further, in the third embodiment described above, the horizontal section of each unit lens portion 11 constituting the diffusion sheet 103 is formed in the non-isosceles trapezoidal shape as shown in FIG. 5. However, the shape of the horizontal section is not limited thereto and may be formed in the various trapezoidal shapes (FIGS. 6 and 7) described below. When the side surfaces 111 of the unit lens portions 11 are formed in a curved surface as shown in FIG. 7, the average angle between the side surface 111 and the light incident surface 112 of the horizontal section of each unit lens portion 11 corresponds to the angles $\theta 3$ and $\theta 4$ in the diffusion sheet 103 shown in FIG. 5. Note that, when the side surface 111 is the curved surface, the average angle is the value obtained by measuring the angle (acute angle) between the straight line connecting both the ends of the side surface 111 and the light incident surface 112.

Modifications of Diffusion Sheets According to First to Third Embodiments (First Modification)

Figure 6:
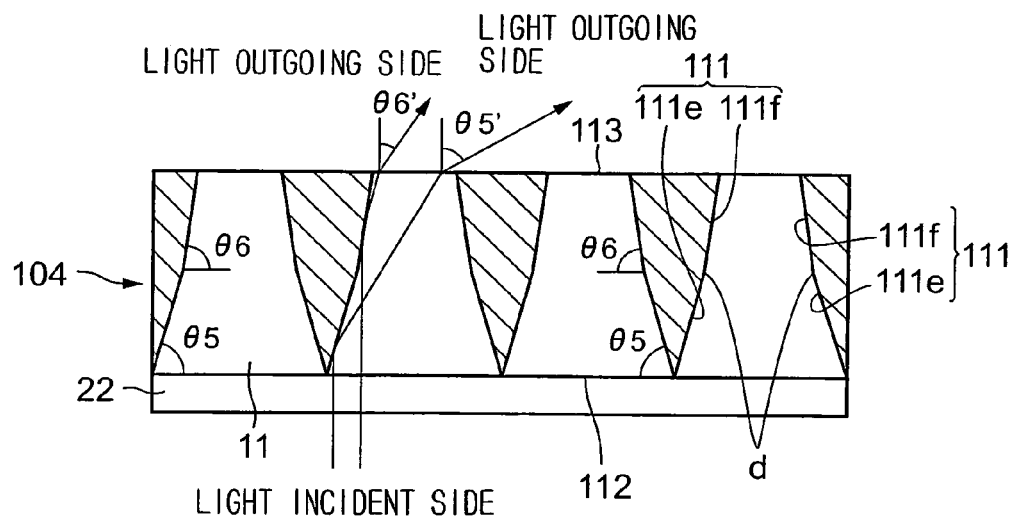
FIG. 6 is a sectional view showing a modification of the diffusion sheets according to the first to third embodiments of the present invention.
Figure 7:
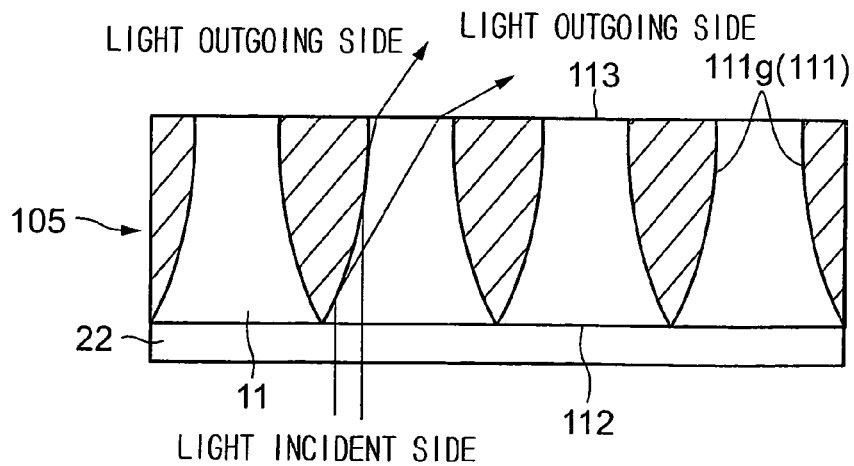
FIG. 7 is a sectional view showing another modification of the diffusion sheets according to the first to third embodiments of the present invention.

In the diffusion sheets 101, 102, and 103 according to the first to third embodiments described above, the horizontal trapezoidal section of each unit lens portion 11 constituting these diffusion sheets may be formed in such a shape that at least one side segment (side surface 111) of the horizontal trapezoidal section is formed in a broken-line shape broken at one or more points d as shown by a diffusion sheet 104 of FIG. 6. Specifically, the side surface 111 (total reflection surface), which corresponds to one side segment of the section of each unit lens portion 11 is divided into a side surface 111e on a light incident surface 112 side and a side surface 111f on a light outgoing surface 113 side by the base point d. The angle $\theta 5$ of one side surface 111 between the side surface 111e on the light incident surface 112 side and the light incident surface 112 is different from the angle $\theta 6$ on the same side surface 111 between the side surface 111f on the light outgoing surface 113 side and the light incident surface 112.

According to the diffusion sheet 104 arranged as described above, since the side surface 111 acting as the total reflection surface has the plurality of flat surfaces 111e and 111f each having a different slant angle, light reflected on one side surface 111 travels at different angles ($\theta 5'$ and $\theta 6'$), thereby the number of traveling directions of light is increased. Accordingly, when both the side surfaces 111 of each unit lens portion 11 are arranged in the same manner, a gain curve showing brightness (gain) to a viewing angle in a horizontal direction (angle between a viewing direction and the normal direction of the sheet) has at least five peaks (maximum values). Further, since the angles at which the respective peaks are obtained are near to each other, the angles at which the peaks are obtained are near to each other, thereby the bottoms of the peaks overlap more effectively. As a result, when the gain of the diffusion sheet 104 is measured, a curve, which is very gentle in its entirety and has a peak at a center, is obtained, thereby an image having better bright uniformity can be obtained.

Figure 11:
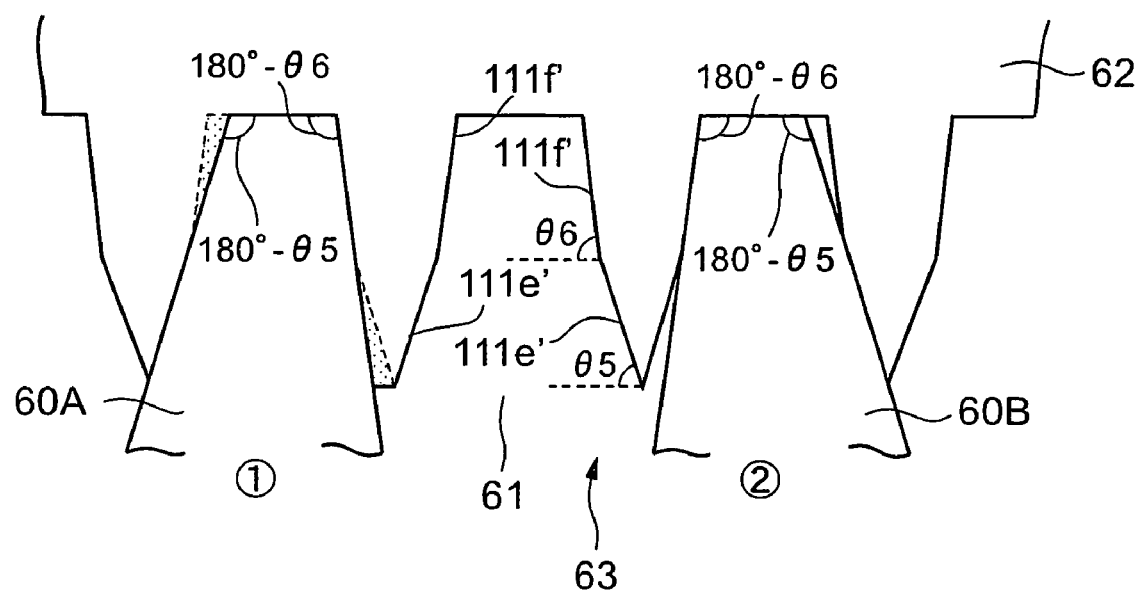
FIG. 11 is a view explaining an example of a method of manufacturing a mold for manufacturing the diffusion sheet shown in FIG. 6.

A mold for molding the diffusion sheet 104 can be manufactured using, for example, cutting tools 60A and 60B as shown in, for example, FIG. 11. The cutting tool 60A has an angle (180°-$\theta 6$) on one side of the tip thereof in accordance with the angle $\downarrow 6$ between the side surface 111f and the light incident surface 112 and an angle (180°-$\theta 5$) on the other side of the tip in accordance with the angle $\theta 5$ between the side surface 111e and the light incident surface 112. Further, the cutting tool 60B has an angle (180°-$\theta 5$) on one side of the tip thereof in accordance with the angle $\theta 5$ between the side surface 111e and the light incident surface 112, and an angle (180°-$\theta 6$) on the other side of the tip in accordance with the angle $\theta 6$ between the side surface 111f and the light incident surface 112. As a specific method of manufacturing the mold, first, a mold material 62 is cut using the cutting tool 60A and forms a surface 111f' (angle $\theta 6$) corresponding to the right side surface 111f of the approximately trapezoidal section and a surface 111e' (angle $\theta 5$) corresponding to the left side surface 111e thereof (reference numeral (1) of FIG. 11). Next, the same position of the mold material 62 is cut using the cutting tool 60B and forms a surface 111e' (angle $\theta 5$) corresponding to the right side surface 111e of the approximately trapezoidal section and a surface 111f (angle θ6) corresponding to the left side surface 111f thereof (reference numeral (2) of FIG. 11). The mold for molding the diffusion sheet 104 can be manufactured by cutting the same position of the mold material 62 using the cutting tools 60A and 60B as described above.

Note that although both the side surfaces 111 of the unit lens portion 11 are formed in the broken line shape in FIG. 6, only one side surface 111 thereof may be formed in the broken line shape depending on a unit lens portion 11. Although only the unit lens portions 11 each having the two types of the angles (θ5 and θ6) are continuously disposed in FIG. 6, the first modification is not limited thereto, and unit lens portions having a combination of other angles may be combined and disposed. Further, although each side segment (the side surface 111) is formed in the shape projecting inward in the approximately trapezoidal section in FIG. 6, the first modification is not limited thereto, and it may be formed in a shape projecting outward. Furthermore, although each side surface 111 of the unit lens portion 11 is provided with the base point d so that it has the two types of the angle in FIG. 6, the first modification is not limited thereto, and each side surfaces 111 may be provided with at least two base points d so that it has at least three types of the angle. However, even if a diffusion sheet having a shape different from that of the diffusion sheet 104 shown in FIG. 6 is used, it is preferable to employ a mode of the unit lens portions and a manner of disposing them such that an image having right/left symmetrical brightness can be obtained when an image surface is viewed in its entirety from the front of the diffusion sheet.

(Second Modification)

In the diffusion sheets 101, 102, and 103 according to the first to third embodiments described above, the horizontal trapezoidal section of each unit lens portion 11 constituting these diffusion sheets may be formed in a such shape that at least one side segment (side surface 111) of the horizontal trapezoidal section is formed in a curved state as shown by a diffusion sheet 105 of FIG. 7. Specifically, a side surface 111 (total reflection surface) 111g (111) corresponding to one side segment of the section of each unit lens portion 11 is composed of a curved surface.

According to the diffusion sheet 105 arranged as described above, since the side surface 111g (111) acting as the total reflection surface is composed of the curved surface, when parallel light is incident on the side surface 111g from a light incident surface 112, the reflecting angle of the parallel light is different depending on a position of the side surface 111g, thereby the number of traveling directions of the light (light outgoing directions) is increased after the light is reflected. Accordingly, when the gain of the diffusion sheet 105 is measured, a curve, which is very gentle in its entirety and has a peak at a center, is obtained, thereby an image having better bright uniformity can be obtained.

It should be noted that, although both the side segments (side surfaces 111) of the approximately trapezoidal section are formed in the shape projecting inward in FIG. 7, the second modification is not limited thereto, and both the side segments of the approximately trapezoidal section may be formed in a shape projecting outward. Otherwise, one side segment of the approximately trapezoidal section may be formed in the shape projecting inward, and the other side segment may be formed in the shape projecting outward. Further, all the side segments (side surfaces 111) need not be formed in the same shape and may be formed in a different shape in the unit lens portions 11. In the latter case, light reflected by the side surfaces 111 can be caused to travel in various directions, thereby the brightness of an image can be made more uniform. However, even if a diffusion sheet having a shape different from that of the diffusion sheet 105 shown in FIG. 7 is used, it is preferable to employ a mode of the unit lens portions and a manner of disposing them such that an image having right/left symmetrical brightness can be obtained when an image surface is viewed in its entirety from the front of the diffusion sheet.

(Third Modification)

Figure 8:
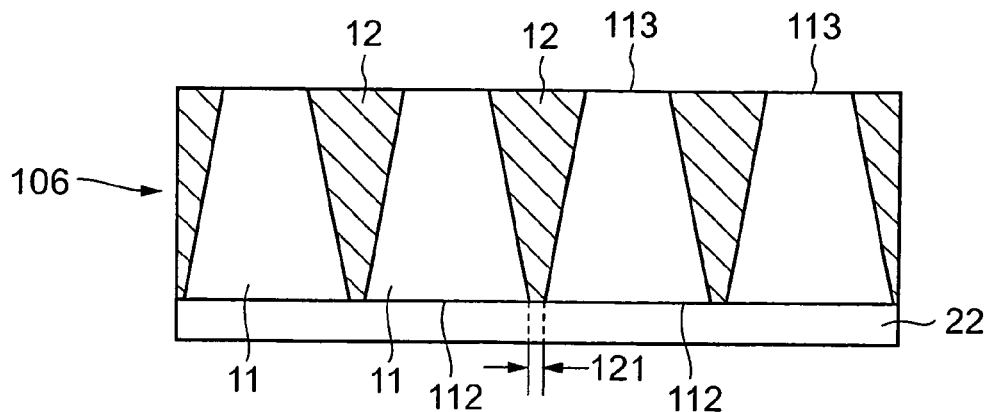
FIG. 8 is a sectional view showing still another modification of the diffusion sheets according to the first to third embodiments of the present invention.

In the diffusion sheets 101, 102, and 103 according to the first to third embodiments described above, it is preferable that the horizontal section (surface cut vertically with respect to the long-axis direction of the unit lens portion 11) of each of the light absorbing portions 12 formed between adjacent unit lens portions 11 be formed in an approximately triangular shape as shown in a diffusion sheet 106 shown in FIG. 8 and that the light incident side vertex of the section be composed of a straight line having a predetermined width (refer to reference numeral 121). Further, it is preferable that the width of the straight line of the light incident side vertex be 2 μm or more to 10 μm or less.

Figure 9:
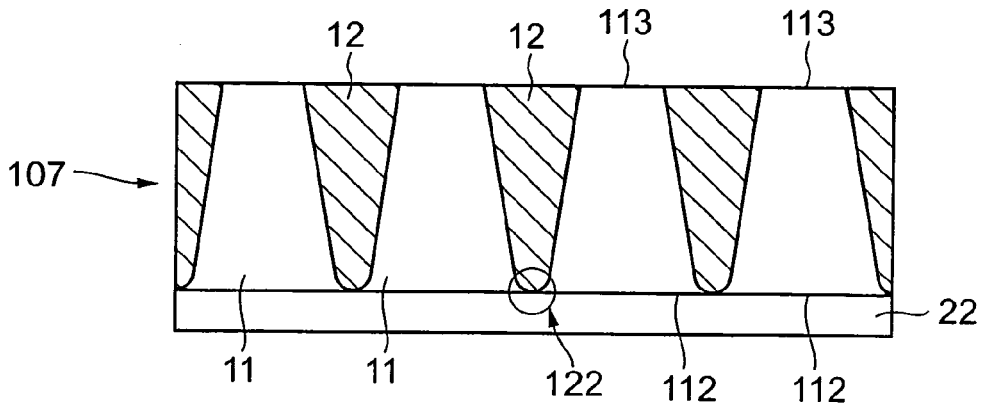
FIG. 9 is a sectional view showing a further modification of the diffusion sheets according to the first to third embodiments of the present invention.

Further, the light incident side vertex of each of the light absorbing portions 12 formed between the adjacent unit lens portions 11 may be composed of a curved line (refer to reference numeral 122) as shown in a diffusion sheet 107 of FIG. 9. It is preferable that the radius of curvature of the curved line of the light incident side vertex be 1 μm or more to 5 μm or less. The curved lines (curved surfaces) of the light incident side vertexes of the diffusion sheet 107 shown in FIG. 9 can be formed by plating, when a mold for molding the diffusion sheet 107 is manufactured, the portions of the mold corresponding to vertex positions 122 of the diffusion sheet 107, and then molding the diffusion sheet 107 using the thus manufactured mold.

According to the diffusion sheets 106 and 107 arranged as described above, the extreme ends of the projections of the mold, which molds a group of the unit lens portions of the diffusion sheets, need not be made steep. Accordingly, the strength of the projections of the mold can be enhanced, thereby the projections of the mold can be prevented from tilting right and left.

Figure 10:
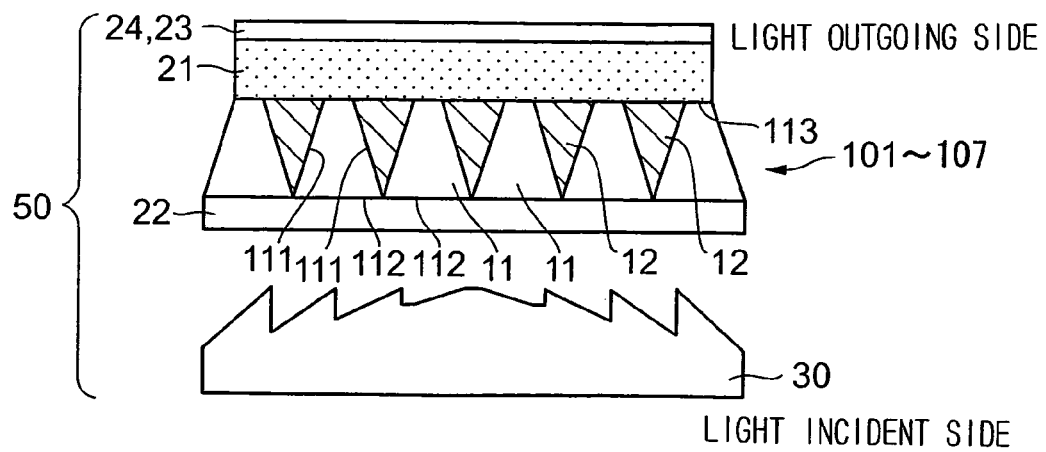
FIG. 10 is a sectional view showing an example of a rear projection screen provided with the diffusion sheet according to the first to third embodiments of the present invention.

Rear Projection Screen Provided with Diffusion Sheets According to First to Third Embodiments The diffusion sheets 101 to 107 according to the first to third embodiments and the modifications thereof described above can be used together with a Fresnel lens sheet 30 disposed on the light incident side of the diffusion sheets 101 to 107, thereby a rear projection screen 50 is arranged as shown in FIG. 10.

The rear projection screen 50 provided with any one of the diffusion sheets 101 to 107 will be schematically explained below with reference to FIG. 10. Note that FIG. 10 is a sectional view of the rear projection screen 50 in use when it is viewed from above an upper surface thereof.

As shown in FIG. 10, the rear projection screen 50 is provided with any one of the diffusion sheets 101 to 107 (hereinafter, simply referred to as the diffusion sheets 101 to 107) and the Fresnel lens sheet 30 disposed on the light incident side thereof. The rear projection screen 50 is used in a rear projection type television, and the like. Further, the Fresnel lens sheet 30 adjusts image light emitted from a light source (not shown) of an image projector, and the like so that it is made to approximate parallel light and introduces the approximately parallel light to the diffusion sheets 101 to 107. The approximately parallel light outgoing from the Fresnel lens sheet 30 is approximately vertically incident on the diffusion sheets 101 to 107, passes through the unit lens portions 11 of the diffusion sheet or is reflected on the side surfaces 111 thereof as described above, and outgoes in respective light outgoing directions. The Fresnel lens sheet 30 is not limited to the shape shown in FIG. 10 and may be formed in any arbitrary shape as long as it has a function for causing the image light, which is emitted from the light source (not shown) of the image projector in enlargement, to outgo as approximately parallel light as well as causing the approximately parallel light to be approximately vertically incident on the diffusion sheets 101 to 107.

According to the rear projection screen 50 arranged as described above, there can be provided a display on which an observer can view an image which has no irregular brightness in an image surface, has good bright uniformity therein, and can be easily viewed even if the observer moves in a horizontal direction, or even if the observer views the image at rest from the front of the rear projection screen 50 or at a position other than the front (however, a position within a viewing angle at which the image can be preferably viewed).

As shown in FIG. 10, it is preferable to dispose a support plate 21 containing a diffusion agent on the light outgoing surface 113 side of the unit lens portions 11 of the diffusion sheets 101 to 107. Since the unit lens portions 11 of the diffusion sheets 101 to 107 are formed in the approximately trapezoidal columnar shape and the light outgoing surfaces 113 are formed flat, the support plate 21 can be joined to the light outgoing surfaces 113 without a problem. Disposition of the support plate 21 as described above permits a reflection prevention layer 23 and a surface hardened layer 24 to be formed on the light-outgoing-side surface of the diffusion sheets 101 to 107, the reflection prevention layer 23 being subjected to a reflection prevention treatment, and the surface hardened layer 24 being subjected to a surface hardening treatment. Note that these layers are disposed on the light-outgoing-side surface of the diffusion sheets 101 to 107 through the support plate 21. Among these layers, the reflection prevention layer 23 can preferably suppress the reflection of external light such as illumination in a room, and the like on the screen. Further, even if the screen is touched with a finger, and the like or wiped for cleaning, the surface of the screen is resistant to scratches due to the surface hardened layer 24.

In the rear projection screen 50 arranged as described above, light, which outgoes from the unit lens portions 11 of the diffusion sheets 101 to 107 and travels in one direction, is refracted when it is incident on and outgoes from the particles of the diffusion agent contained in the support plate 21 and further is reflected on the outside surfaces of the particles of the diffusion agent and diffused, thereby the light travels in a plurality of directions. Accordingly, the irregular brightness of an image due to a position of the observer can be reduced. The diffusion agent, which is referred to here, is particles composed of a resin, and the like having a refractive index different from that of the resin, and the like that forms the support plate 21, and the particles are scattered in the support plate 21. Acrylic cross-linked beads, glass beads, and the like are used as the diffusion agent. When the support plate 21 is disposed on the diffusion sheets 101 to 107, peaks (maximum values) other than the peak at the center of the gain curve described above can be eliminated by the diffusion of the particles of the diffusion agent.

Further, it is preferable in the rear projection screen 50 to make the light-outgoing-side surface of the support plate 21 flat. Making the light-outgoing-side surface of the support plate 21 flat permits the observer to easily view an image because the image can be expressed flat without distortion. Further, since the surfaces of the diffusion sheets 101 to 107 are not curved and have no irregularities, the surfaces can be simply wiped by hand, thereby it is possible to make the surfaces of the diffusion sheets 101 to 107 free from scratches and dusts.

Further, it is preferable in the rear projection screen 50 to provide the support plate 21 with an ultraviolet ray absorbing action by containing an ultraviolet ray absorption agent in the support plate 21. With this arrangement, ultraviolet rays included in external light can be absorbed by the support plate 21, thereby deterioration (color change, quality deterioration, and the like) of a plastic material constituting the unit lens portions 11, and the like in the diffusion sheets can be prevented. Note that, when a material, which forms the support plate 21, has the ultraviolet ray absorbing action by itself, it is not always necessary for the support plate 21 to separately contain the ultraviolet ray absorption agent. An acrylic acid ester resin, and the like can be used to form the support plate 21 as a material having the ultraviolet ray absorbing action. Further, when a resin, which is unlikely to absorb ultraviolet rays, is used as a material for forming the support plate 21, it is preferable to contain benzophenone, benzotriazole, or acrylate or salicylate ultraviolet ray absorbing agent in the support plate 21.

Diffusion Sheet According to Fourth Embodiment

Next, a diffusion sheet according to a fourth embodiment of the present invention will be explained with reference to FIGS. 12, 13A, and 13B. Note that the terms "right" and "left" used in the following explanation correspond to "right" and "left" when the diffusion sheet is assembled and used in a rear projection screen for a rear projection type television.

Figure 12:
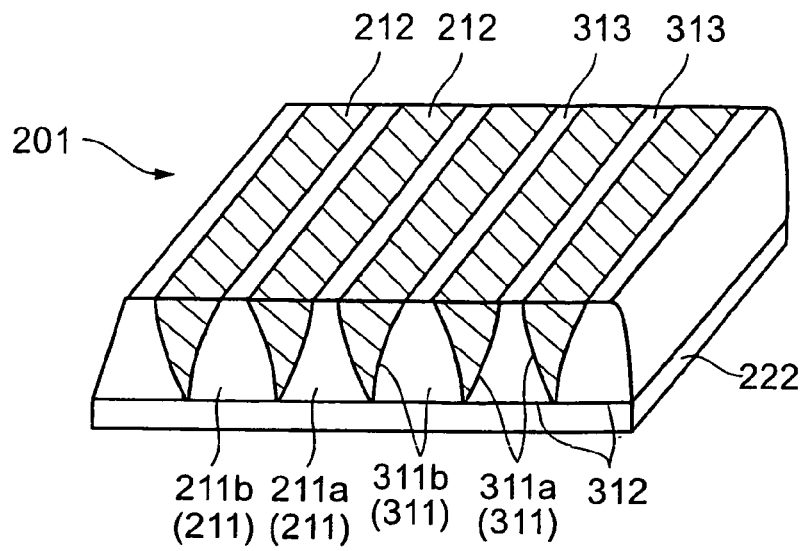
FIG. 12 is a perspective view showing an example of a diffusion sheet according to a fourth embodiment of the present invention.

As shown in FIG. 12, the diffusion sheet 201 according to the fourth embodiment of the present invention has a plurality of unit lens portions 211 formed in an approximately trapezoidal columnar shape. As shown in FIGS. 12 and 13A, each unit lens portion 211 has a horizontal section (surface obtained by cutting the unit lens portion 211 vertically with respect to the long axis direction thereof) formed in an approximately trapezoidal shape, and has surfaces (side surfaces 311) corresponding to the side segments of the section, a lower bottom surface (light incident surface 312) corresponding to the long bottom segment of the section and an upper bottom surface (light outgoing surface 313) corresponding to the short bottom segment of the section. In the trapezoidal section, both the bottom surfaces (that is, the upper and lower bottom surfaces) thereof are formed in parallel with each other. Further, although there may be a case that the sections of the unit lens portions 211 are not formed in an accurate trapezoidal shape, explanation will be made in the description supposing that they are formed in the trapezoidal shape for the purpose of convenience. Note that each unit lens portion 211 is also called a lenticular lens, and the diffusion sheet 201 is also called a lenticular lens sheet.

The unit lens portions 211 are continuously disposed on a transparent resin film substrate 222 so that the long axes thereof are in parallel with each other. At the time, the unit lens portions 211 are disposed such that all the large surfaces (light incident surfaces 312 in FIG. 12) of the upper bottom surfaces and the lower bottom surfaces of the unit lens portions 211 are located on a light-incident-side flat surface (on the surface of the transparent resin film substrate 222).

Further, a plurality of approximately triangle columnar light absorbing portions 212 are interposed between adjacent unit lens portions 211 to absorb external light incident from a light outgoing side. Note that the light absorbing portion 212 are also called black stripes.

Image light emitted from a light source (not shown) is incident on the diffusion sheet 201 arranged as described above from the light incident surface 312 of the unit lens portions 211 and outgoes from the light outgoing surface 313 thereof after it passes through the unit lens portions 211.

The unit lens portions 211 have the side surfaces 311 composed of curved surfaces and acting as boundaries between the unit lens portions 211 and the light absorbing portions 212 so that a part of the light incident on the unit lens portions 211 from the light incident side thereof is totally reflected on the side surfaces 311a and 311b (311). Accordingly, the refractive index n1 of the unit lens portion 211 and the refractive index n2 of the light absorbing portion 212 must satisfy a relation of n1>n2, and thus the materials constituting the respective parts of the unit lens portions 211 and the light absorbing portion 212 are selected to satisfy the above relation.

Note that the material of the unit lens portions 211 is not particularly limited as long as it satisfies the relation between the refractive indices n1 and n2, and a resin and the like that are conventionally used as the material of the lenticular lens can be used. Specifically, a radiation-setting type resin, a thermoplastic resin, and the like, for example, can be exemplified. Among them, when the radiation-setting resin is used, it is possible to mold the unit lens portions 211 faithfully to a mold shape.

In contrast, the light absorbing portions 212 prevent the reflection of external light by absorbing and/or shielding external light, which is incident from the light outgoing side, and external light, which is incident on the unit lens portions 211 from the light outgoing surfaces 313 thereof and reaches the side surfaces 311. The above function of the light absorbing portions 212 prevents the deterioration of contrast of an image to be viewed.

Note that, the material of the light absorbing portions 212 is not particularly limited as long as it satisfies the relation between the refractive indices n1 and n2, and a low refractive index acrylate resin, and the like to which, silicon, fluorine, and the like are introduced can be used. Further, the light absorbing portions 212 may be added with light absorbing particles to absorb and/or shield external light. Exemplified as the light absorbing particles are, for example, pigments such as carbon, and the like, a plurality of dyes of red, blue, yellow, black, and the like or and/or acrylic cross-linked particles colored with the pigments and/or the dyes, and the like.

Although the size of the diffusion sheet 201 arranged as described above is not particularly limited, it is ordinarily preferable that the size be about (50 cm long)×(70 cm wide)× (0.1 cm thick) to (150 cm long)×(200 cm wide)×(0.5 cm thick). Further, although the size of the unit lens portions 211 is not particularly limited, it is ordinarily preferable that the width of the light incident surface 312 be 50 to 80 µm, the distance between the light incident surface 312 and the light outgoing surface 313 (lens height) be 100 to 170 µm, and the length in the long-axis direction be 50 to 150 cm. It is possible to enhance the resolution of an image by miniaturizing the size of each unit lens portion 211 as described above.

The diffusion sheet 201 arranged as described above will be explained in detail with reference to FIGS. 13A, and 13B.

Figure 13A:
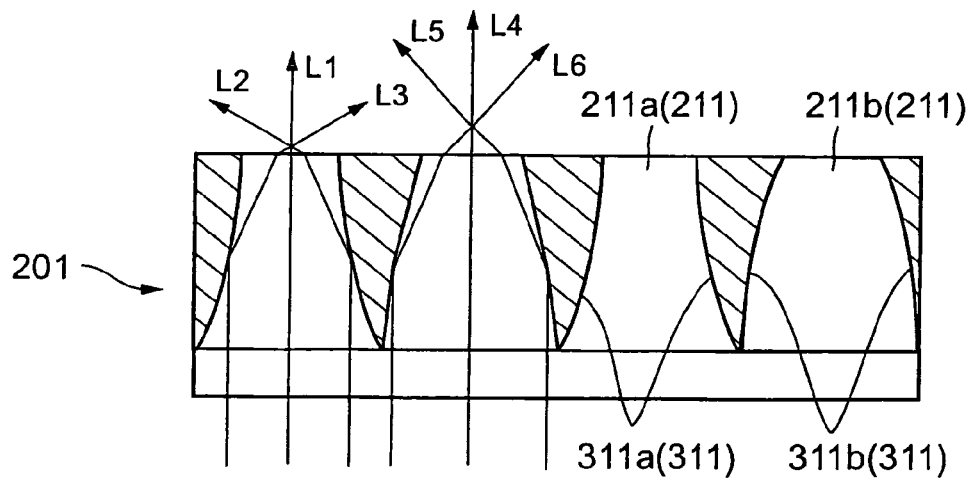
FIG. 13A is a sectional view showing a light traveling direction in the diffusion sheet shown in FIG. 12.

As shown in FIG. 13A, the diffusion sheet 201 is composed of unit lens portions 211a and unit lens portions 211b disposed therein continuously and alternately, each of the unit lens portions 211 having an approximately trapezoidal section both the side segments (side surfaces 311a) of which are composed of curved lines projecting inward, and each of the unit lens portions 211b having an approximately trapezoidal section both the side segments (side surfaces 311b) of which are composed of curved lines projecting outward. Accordingly, in the diffusion sheet 201, the plurality of side segments 311 of the sections of the unit lens portions 211a and 211b (211) includes, as a whole, both the side segments (side surfaces 311a) each composed of the curved line projecting inward and the side segments (side surfaces 311b) each composed of the curved line projecting outward. In the diffusion sheet 201, the number of the side segments (side surfaces 311a) each composed of the curved line projecting inward in the section of each unit lens portion 211a is approximately the same as the number of the side segments (side surfaces 311b) each composed of the curved line projecting outward in the section of each unit lens portions 211b as a whole. Further, in the diffusion sheet 201, the number of right side segments (right side surfaces 311a) each composed of the curved line projecting inward is approximately the same as the number of left side segments (left side surfaces 311a) each composed of the curved line projecting inward, and the number of right side segments (right side surfaces 311b) each composed of the curved line projecting outward is approximately the same as the number of left side segments (left side surfaces 311b) each composed of the curved line projecting outward.

Further, in the diffusion sheet 201, although the average angle between the long bottom segment (light incident surface 312) and each side segment (side surface 311 acting as the total reflection surface) of the approximately trapezoidal section of each unit lens portion 211 is not particularly limited, it is about 75° to 89° and preferably about 80° to 84°. The average angle is the value obtained by measuring the angle (acute angle) between the straight line connecting both the ends of the side surface 311 acting as the total reflection surface and the light incident surface 312. Note that a reason why the average angle is measured is in that when the side segment 311 acting as the total reflection surface is composed of the curved surface, an accurate angle cannot be specified.

Figure 13B:
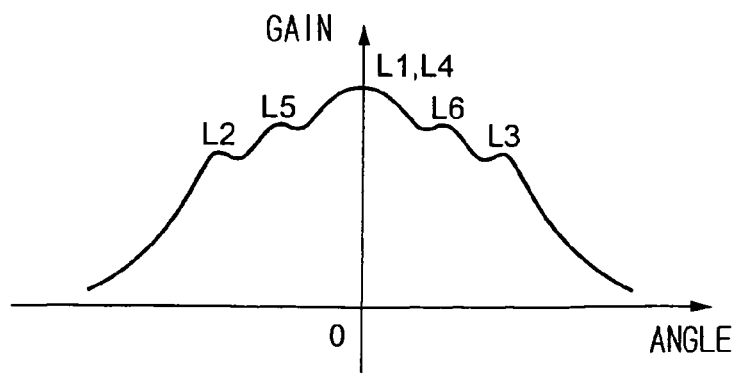
FIG. 13B is a graph showing the relation (gain curve) between a viewing position (angle) and the brightness of an image (gain) in the diffusion sheet shown in FIG. 13A.

According to the diffusion sheet 201 arranged as described above, light from the unit lens portions 211a and 211b (211) of the diffusion sheet 201 outgoes mainly in five directions as shown in FIG. 13B. The five directions referred to here is a total of one direction (L1, L4) in which light travels straight without being reflected on the side surfaces 311a and 311b (311) of the unit lens portions 211, two directions (L2 and L3) in which light travels right and left at an angle apart from a center by being reflected on the side surfaces 311a projecting inward, and two directions (L5 and L6) in which light travels right and left at an angle near to the center by being reflected on the side surfaces 311b projecting outward. Since each of the side surfaces 311a and 311b (311) acting as the total reflection surfaces is composed of the curved surface, actually, light reflected on the side surfaces 311a and 311b (311) does not entirely outgo in the same direction. However, it is assumed here that the outgoing light travels in the respective outgoing directions (L2, L3, L5, and L6) as the central outgoing directions thereof. Accordingly, when the gain obtained by the diffusion sheet 201 is measured, a gain curve, which shows brightness (gain) to a viewing angle in a horizontal direction (angle between a viewing direction and the normal direction of the sheet), has at least five peaks (maximum values) of brightness corresponding to the respective light outgoing directions. Since the bottoms of the peaks overlap, the gain curve is a right/left symmetrical gentle curve having a peak at a center in its entirety as shown in FIG. 13B. As described above, in the diffusion sheet 201, the gain curve can be improved to the gentle right/left symmetrical curve.

Accordingly, when an observer views an image from a light source (not shown) from the side of the light outgoing surfaces 313 of the unit lens portions 211a and 211b (211), the image is brightest when the observer views it from the front of the sheet surface, and the image gradually becomes darker as the angle between a normal to the sheet surface and a visual line increases. Accordingly, even if the observer moves in a horizontal direction, he or she does not view the image in extremely different brightness, thereby the observer can easily view the image in a natural state. Further, even if the observer views the image at rest, there is no irregular brightness in one image surface, and he or she can view the image excellent in bright uniformity without irregular brightness, thereby the observer can easily view the image in the natural state.

(Method of Manufacturing Diffusion Sheet)

Next, a method of manufacturing the diffusion sheet 201 according to the fourth embodiment of the present invention will be explained.

First, a mold (metal mold) for a diffusion sheet is prepared to mold the approximately trapezoidal columnar unit lens portions 211. The mold may be formed in a flat shape or in a roll shape. A method of manufacturing the mold for a diffusion sheet will be explained in detail later.

Next, although the diffusion sheet is manufactured using the mold for a diffusion sheet manufactured as described above, there are two types of methods as specific methods of molding the diffusion sheet.

A molding method using the roll-shaped forming mold will be explained as a first molding method. In this case, a PET film acting as a transparent film substrate 222 of the diffusion sheet 201 is caused to pass between the roll-shaped mold fixed on a rotatable shaft and a roller as well as a liquid resin (ultraviolet-ray setting resin), which is composed of the material described in the methods of manufacturing the diffusion sheet described above and forms the unit lens portions 211, is flown between the PET film and the roll-shaped mold. The resin is caused to pass along the roll-shaped mold together with the PET film and molded in the shape of the plurality of unit lens portions 211. After the PET film and the resin are caused to pass between the roll-shaped forming mold and the roller, ultraviolet rays are illuminated onto the resin on the PET film to thereby set the resin. Thereafter, a sheet composed of the set resin and the PET film is removed from the roll-shaped forming mold. The main portion of the diffusion sheet 201 is formed by continuously executing the above process.

A molding method using the flat-shaped forming mold will be explained as a second molding method. In this case, the liquid resin (ultraviolet-ray setting resin), which is composed of the material described above and forms the unit lens portions 211, is applied (coated) on the flat-shaped mold so that it is buried therein, the PET film acting as the transparent resin film substrate 222 is placed on the resin and pressed, and then ultraviolet-rays are illuminated onto the resin to thereby set the resin. Thereafter, a sheet composed of the set resin and the PET film is removed from the mold, thereby the main portion of the diffusion sheet 201 is formed.

Thereafter, the material (black resin) for the light absorbing portions 212 described above is applied (coated) in the grooves formed between the unit lens portions 211 of the sheet that is removed from the mold in any of the first and second molding methods, thereby the light absorbing portions 212 are formed. The diffusion sheet 201 according to the fourth embodiment of the present invention is manufactured by the methods described above.

The method of manufacturing the mold for the diffusion sheet described above will be explained with reference to FIGS. 14 to 16.

In general, the mold is manufactured by cutting a mold material to form approximately trapezoidal recesses corresponding to the unit lens portions 211 therein. A deformation resistant material such as a steel material and the like may be used as the mold material. However, when the deformation resistant material is used, a cutting tool, which will be described later, is liable to be broken when it cuts the deformation resistant material. When the cutting tool is broken, productivity is greatly deteriorated because cutting must be resumed from the beginning. Accordingly, it is preferable to use materials excellent in machinability such aluminum, copper, nickel, and the like. When the roll-shaped mold is manufactured as the mold described above, a roll-shaped mold material composed of a soft metal, and the like is mounted on a lathe, and the approximately trapezoidal columnar recesses are sequentially formed by cutting the mold material with the cutting tool, and the like while turning the mold material.

More specifically, a plurality of trapezoidal columnar recesses for unit lens portions are formed in the mold material alternately by cutting the mold material while remaining spaces for trapezoidal columnar recesses for unit lens portions at least each one of which is to be located adjacent to each of the above unit lens portions. Thereafter, the remaining spaces of the metal mold are cut to form trapezoidal columnar recesses for the unit lens portions at least each of which is located adjacent to each of the above unit lens portions. Specific examples of the method of manufacturing the mold for the diffusion sheet described above will be explained below with reference to FIGS. 14 to 16.

(First Example of Method of Manufacturing Mold for Diffusion Sheet)

First, a first specific example of the method of manufacturing the mold for the diffusion sheet will be explained with reference to FIG. 14.

Figure 14:
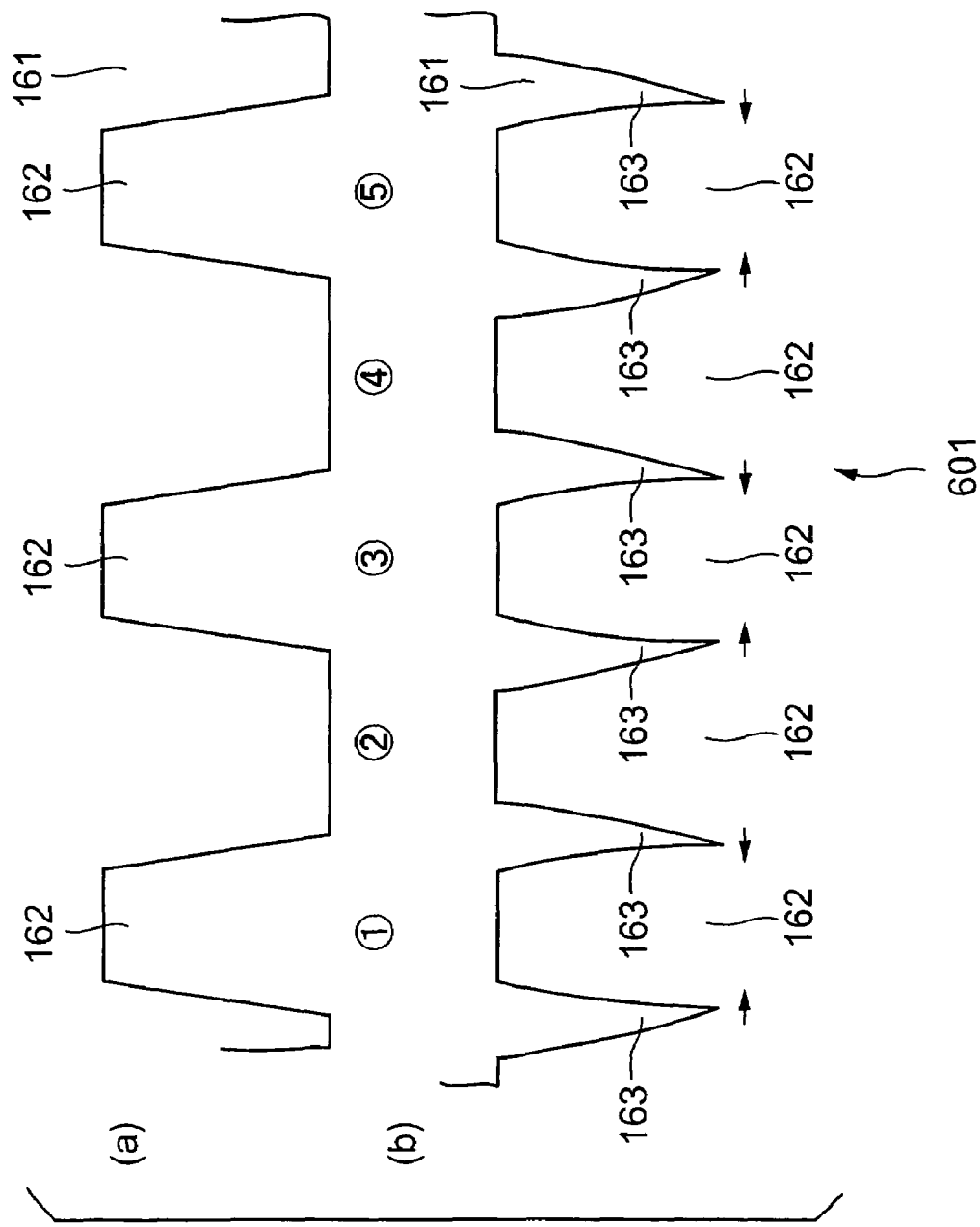
FIG. 14 is a view explaining a first example of a method of manufacturing a mold for manufacturing the diffusion sheet according to the fourth embodiment of the present invention.

As shown in a part (a) of FIG. 14, at a first step, a mold material 161 is prepared, and the mold material 161 is cut to alternately form trapezoidal columnar recesses (grooves) 162 for unit lens portions while remaining spaces for recesses for unit lens portions each one of which is to be located adjacent to each of the above unit lens portions. When numbers (1), (2), (3) . . . , are sequentially given to the spaces of the mold material 161 for the recesses of the unit lens portions from the space for the recess of the unit lens portion located at the left end as shown in the part (a) of FIG. 14, the spaces of the mold material 161 corresponding to the odd numbers are cut at the first step.

Next, as shown in a part (b) of FIG. 14, the remaining spaces of the mold material 161 are cut likewise to form trapezoidal columnar recesses 162 for unit lens portions at a second process. When the numbers described above are referred to, the spaces of the mold material 161 corresponding to the even numbers are cut at the second step.

When the trapezoidal columnar recesses 162 for the unit lens portions are formed by cutting the mold material 161 as described above, a force is naturally applied to the mold material 161. Accordingly, projections 163 located on both the sides of the trapezoidal columnar recesses 162 formed later tilt outward thereof (on the side of the recesses 162 having been cut). As a result, the projections 163 formed between the recesses 162 tilt in the sequence of "left, right", "left, right", "left, right", . . . on the section of a mold 601 as shown in the part (b) of FIG. 14. Note that, although the spaces corresponding to the odd numbers are cut first in the above description, the spaces corresponding to the even number may be cut first. In the case, the projections 163 formed between the recesses 162 of the mold material 161 also tilt left and right in the approximately same sequence as the above case, thereby the number of the projections 163 which tilt left is approximately the same as the number of the projections 163 which tilt right in the mold 601 in its entirety.

(Second Example of Method of Manufacturing Mold for Diffusion Sheet)

Next, a second specific example of the method of manufacturing the mold for the diffusion sheet will be explained with reference to FIG. 15.

Figure 15:
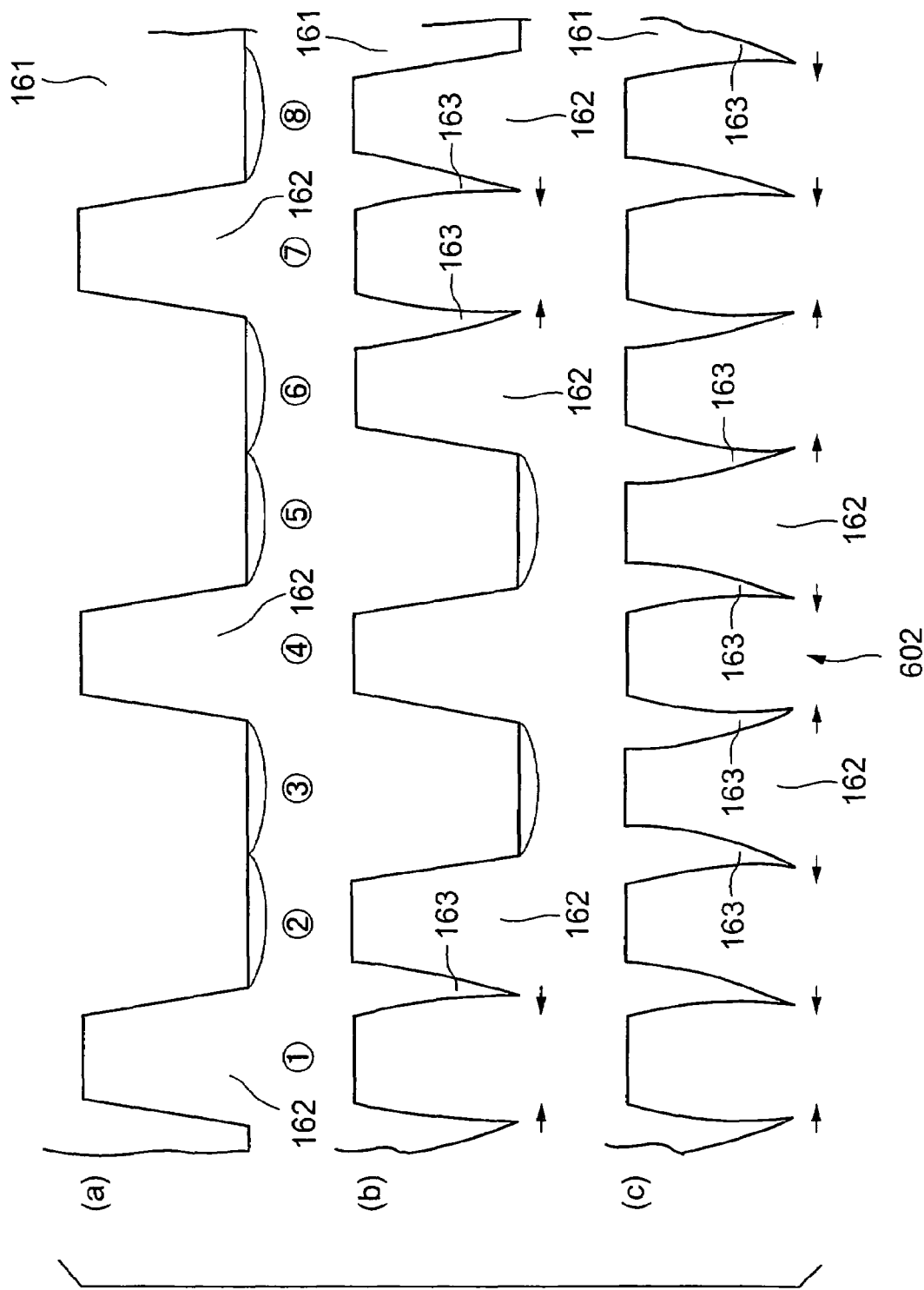
FIG. 15 is a view explaining a second example of the method of manufacturing the diffusion sheet according to the fourth embodiment of the present invention.

As shown in a part (a) of FIG. 15, at a first step, a mold material 161 is prepared, and the mold material 161 is cut to form trapezoidal columnar recesses (grooves) 162 for unit lens portions at intervals of two recesses while remaining spaces for recesses for unit lens portions each two of which are to be located adjacent to each of the above unit lens portions. When numbers (1), (2), (3), . . . are sequentially given to the spaces of the mold material 161 for the recesses of the unit lens portions from the space for the recess of the unit lens portion located at the left end, the spaces corresponding to the numbers represented by (multiples of 3+1), for example, 1, 4, 7, 10, 13, . . . are cut at the first step.

Next, as shown in a part (b) of FIG. 15, at a second step, a trapezoidal columnar recess 162 for a unit lens portion is formed to one of each remaining spaces for the recesses for two unit lens portions likewise. When the numbers described above are referred to, the spaces of the mold material 161 corresponding to the numbers represented by multiples of 6 and the numbers represented by (multiples of 6+2), for example, (2, 6, 8, 12, 14, . . .) are cut at the second step.

Next, as shown in a part (c) of FIG. 15, trapezoidal columnar recesses 162 for unit lens portions are formed to the remaining spaces likewise at a third process. When the numbers described above are referred to, the spaces corresponding to the numbers 3, 5, 9, 11, 15, . . . are cut at the third step.

When the trapezoidal columnar recesses 162 for the unit lens portions are formed by cutting the mold material 161 as described above, a force is naturally applied to the mold material 161. Accordingly, projections 163 located on both the sides or on one side of the trapezoidal columnar recesses 162 formed later tilt outward thereof (on the side of the recesses 162 having been cut). As a result, the projections 163 formed between the recesses 162 tilt in the sequence of "left, left, right, left, right, right", "left, left, right, left, right, right", . . . on the section of a mold 602 as shown in the part (c) of FIG. 15. It should be noted that the sequence in which the recesses 162 for the unit lens portions are formed is not limited to the one described above, and the recesses can be formed in any arbitrary sequence as long as the sequence in which the projections 163 formed between the recesses 162 for the unit lens portions tilt left and right is approximately the same as the above sequence, and the number of the projections 163 which tilt right is approximately the same as the number of the projections 163 which tilt left in the mold 602 in its entirety.

(Third Example of Method of Manufacturing Mold for Diffusion Sheet)

Next, a third specific example of the method of manufacturing the mold for the diffusion sheet will be explained with reference to FIG. 16.

Figure 16:
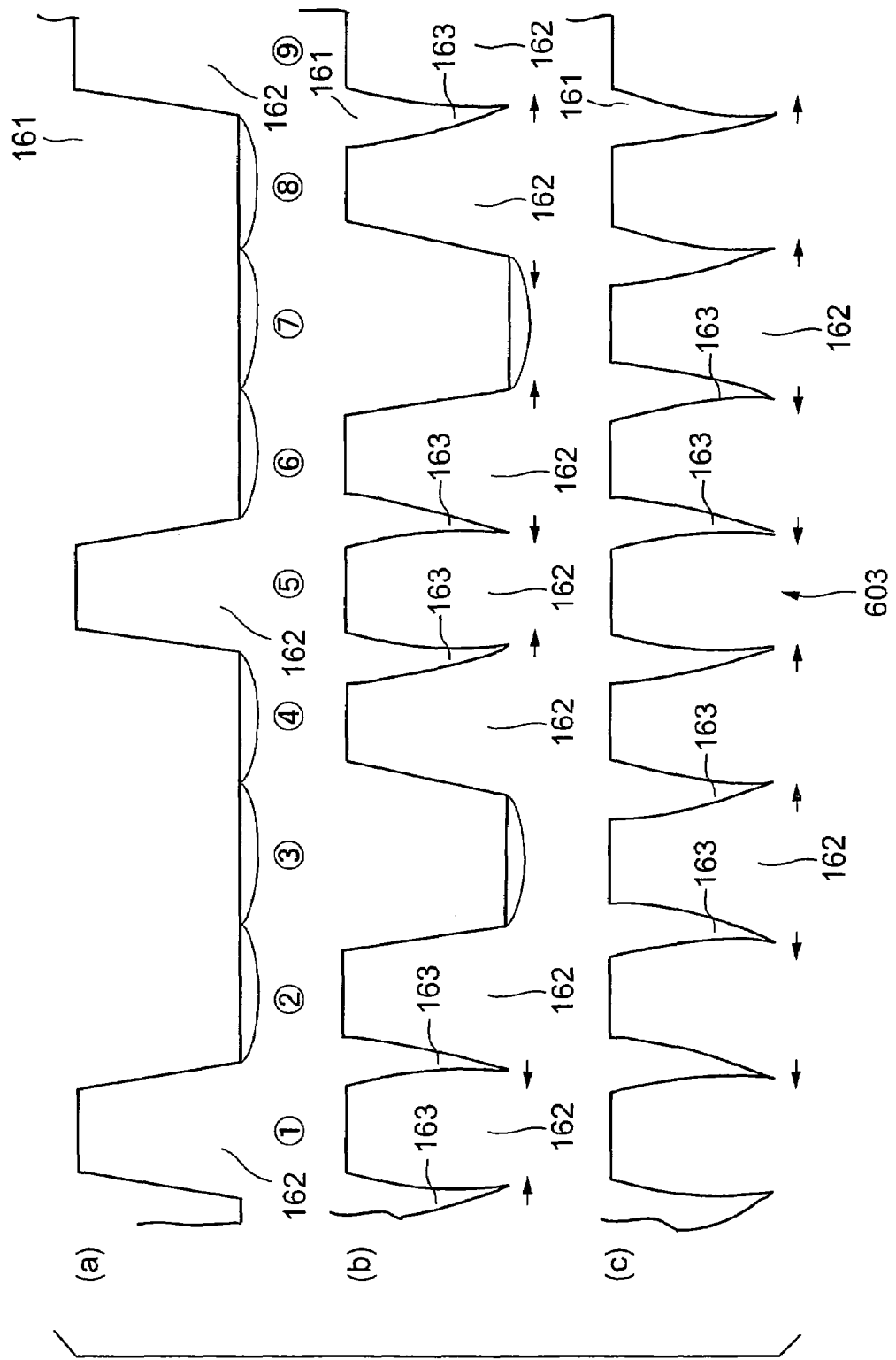
FIG. 16 is a view explaining a third example of the method of manufacturing the diffusion sheet according to the fourth embodiment of the present invention.

As shown in a part (a) of FIG. 16, at a first step, a mold material 161 is prepared, and the mold material 161 is cut to form trapezoidal columnar recesses (grooves) 162 for unit lens portions at intervals of three recesses while remaining spaces for recesses for three unit lens portions each three of which are to be located adjacent to each of the above unit lens portions. When numbers (1), (2), (3), . . . are sequentially given to the spaces of the mold material 161 for the recesses of the unit lens portions from the space for the recess of the unit lens portion located at the left end, the spaces corresponding to the numbers represented by (multiples of 4+1), for example, (1, 5, 9, 13, 17, . . . ) are cut at the first step.

Next, as shown in a part (b) of FIG. 16, trapezoidal columnar recesses 162 for unit lens portions are formed in the spaces, which are located on both the sides of each of the recesses 162 formed previously, of the remaining spaces for the recesses of each three unit lens portions. When the numbers described above are referred to, the spaces corresponding to the numbers represented by multiples of 2 (for example, 2, 4, 6, 8, 10, 12, 14, 16, 18, . . . ) are cut at the second step.

Next, as shown in a part (c) of FIG. 16, at a third step, trapezoidal columnar recesses 162 for unit lens portions are formed in the remaining spaces likewise. When the numbers described above are referred to, the spaces of the mold material 161 corresponding to the numbers 3, 7, 11, 15, 19, . . . are cut at the third step.

When the trapezoidal columnar recesses 162 for the unit lens portions are formed by cutting the mold material 161 as described above, a force is naturally applied to the mold material 161. Accordingly, projections 163 located on both the sides or on one side of the trapezoidal columnar recesses 162 formed later tilt outward thereof (on the side of the recesses 162 having been cut). As a result, the projections 163 formed between the recesses 162 tilt in the sequence of "left, left, right, right", "left, left, right, right", . . . on the section of a mold 603 as shown in the part (c) of FIG. 16. It should be noted that the sequence in which the recesses 162 for the unit lens portions are formed is not limited to the one described above, and the recesses can be formed in any arbitrary sequence as long as the sequence in which the projections 163 formed between the recesses 162 for the unit lens portions tilt left and right is approximately the same as the above sequence, and the number of the projections 163 which tilt right is approximately the same as the number of the projections 163 which tilt left in the mold 603 in its entirety.

In the methods of manufacturing the mold for the diffusion sheet according to the first to third examples described above, there is exemplified the case that the projections 163 formed by cutting the mold material 161 are deformed (plastically deformed) outward when they are viewed from recesses 162 being cut. However, the mold material 161 can be cut by the same procedure even if the projections 163 formed by cutting the mold material 161 are deformed (elastically deformed) inward when they are viewed from recesses 162 being cut, inversely to the above case. In the latter case, a mold for the diffusion sheet, which is similar to that of the former case in its entirety, can be manufactured although the projections 163 deform in an opposite direction. Further, the diffusion sheet according to the fourth embodiment of the present invention described above can be also molded by the mold of the latter case. Note that, in the mold of the latter case, the projections 163 formed between adjacent recesses 162 are formed in such a shape that they tilt from the side of the recesses 162 formed previously toward the side of the recesses 162 formed later.

In addition to the above molds, there may be manufactured a mold which molds a diffusion sheet having projections 163 both the sides of which are formed in a curved shape by the cooperative action of the elastic deformation and the plastic deformation of the mold material 161, although the projections 163 formed between adjacent recesses 162 is not formed in a tilt shape. Further, there is also a mold by which the side surfaces of the projections 163 formed between adjacent recesses 162 are formed in a flat shape in place of a curved shape because the mold material 161 is neither elastically deformed nor plastically deformed by the mold. The diffusion sheet according to the fourth embodiment described above can be also molded by the molds as described above. Note that the elastic deformation and the plastic deformation of the mold material 161 are ordinarily varied depending on the cutting conditions (for example, a speed at which the mold material 161 is cut, the state of the blade of a cutting tool, and the like) of the mold material 161. Accordingly, when the mold for the diffusion sheet is manufactured, it is preferable to confirm which of the elastic deformation and the plastic deformation occurs in the mold material 161 under the cutting conditions thereof employed at the time. However, it is possible as described above to manufacture a mold for molding a diffusion sheet in which the side surfaces of the projections 163 can be formed in a desired shape and tilt as desired by cutting mold material 161 by the same cutting procedure regardless that the mold material 161 is subjected to any of the deformations.

It should be note that the method of manufacturing the mold for molding the diffusion sheet according to the fourth embodiment of the present invention is not limited to the manufacturing methods according to the first to third examples described above, and any other manufacturing methods can be arbitrarily used as long as the number of the rightward projections formed between the recesses for the unit lens portions is approximately the same as the number of the leftward projections formed between the recesses for the unit lens portions in the mold in its entirety. It is preferable in the mold manufactured as described above that the projections formed between the recesses for the unit lens portions tilt symmetrically right and left as a whole. Further, it is also preferable for the diffusion sheet molded by the above mold to permit light to uniformly outgo therefrom in the range of a wide angle (range from an angle near to a center to an angle apart from the center).

(Master Mold for Diffusion Sheet)

A master mold for the diffusion sheet can be manufactured by the same procedure as that of the method of manufacturing the mold for the diffusion sheet described above. The mold for the diffusion sheet may be copied using the master mold for the diffusion sheet manufactured as described above, and then the diffusion sheet may be molded using the thus copied mold.

Specifically, first, the master mold is manufactured by the same procedure as the method of manufacturing the mold described above. Next, a first forming layer composed of nickel, and the like is formed on a surface of the master mold manufactured as described above by, for example, electroforming, and the like. The first forming layer is removed from the master mold and used as a mother mold. Next, a second forming layer composed of nickel, and the like is formed on a surface of the mother mold by, for example, electroforming, and the like. The second forming layer is removed from the mother mold and used as the mold for molding the diffusion sheet after it is subjected to backing as necessary. Since the mold manufactured as described above is formed in the same shape as the master mold, it is formed in the same shape as the mold manufactured by the method of manufacturing the mold described above.

Since a mold material of the master mold also has one or both of the plastically deforming characteristic and the elastically deforming characteristic described above, the master mold is manufactured according to the characteristics so that the side surfaces of the projections of the master mold are formed in a desired shape and tilt as desired.

Figure 17:
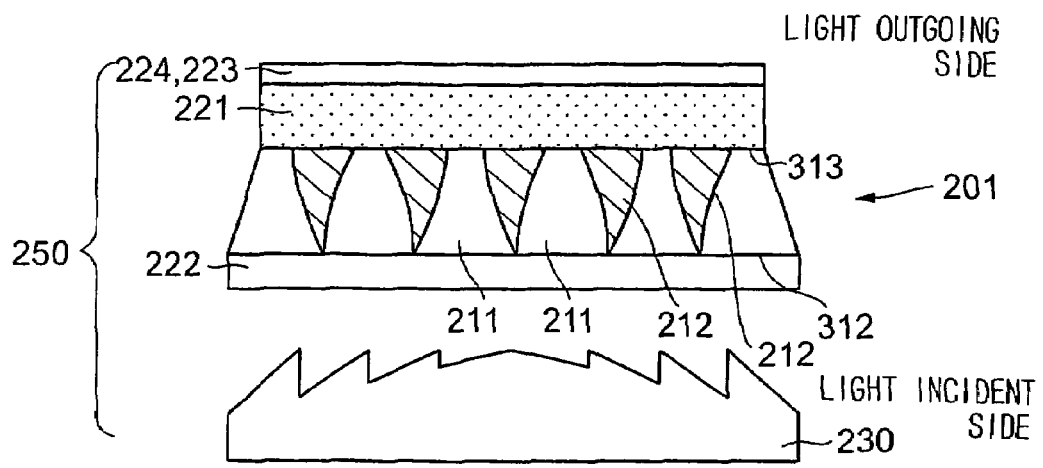
FIG. 17 is a sectional view showing an example of a rear projection screen provided with the diffusion sheet according to the fourth embodiment of the present invention.

Rear Projection Screen Provided with Diffusion Sheet According to Fourth Embodiment A diffusion sheet 201 according to the fourth embodiment can be used together with a Fresnel lens sheet 230 disposed on the light incident side of the diffusion sheets 201, thereby a rear projection screen 250 is arranged as shown in FIG. 17.

The rear projection screen 250 provided with the diffusion sheet 201 will be schematically explained below with reference to FIG. 17. Note that FIG. 17 is a sectional view of the rear projection screen 250 in use when it is viewed from above an upper surface thereof.

As shown in FIG. 17, the rear projection screen 250 is provided with the diffusion sheet 201 and the Fresnel lens sheet 230 disposed on the light incident side thereof. The rear projection screen 250 is used in a rear projection type television, and the like. Further, the Fresnel lens sheet 230 adjusts image light emitted from a light source (not shown) of an image projector, and the like so that it is made to approximate parallel light and introduces the approximately parallel light to the diffusion sheet 201. The approximately parallel light outgoing from the Fresnel lens sheet 230 is approximately vertically incident on the diffusion sheet 201, passes through the unit lens portions 211 of the diffusion sheet 201 or is reflected on the side surfaces 212 thereof and outgoes in respective light outgoing directions. The Fresnel lens sheet 230 is not limited to the shape shown in FIG. 17 and may be formed in any arbitrary shape as long as it has a function for causing the image light, which is emitted from the light source (not shown) of the image projector, and the like in enlargement, to outgo as approximately parallel light as well as causing the approximately parallel light to be approximately vertically incident on the diffusion sheet 201.

According to the rear projection screen 250 arranged as described above, there can be provided a display on which an observer can view an image which has no irregular brightness in an image surface, has good bright uniformity therein, and can be easily viewed even if the observer moves in a horizontal direction, or even if the observer views the image at rest from the front of the rear projection screen 250 or at a position other than the front (however, a position within a viewing angle at which the image can be preferably viewed).

As shown in FIG. 17, it is preferable to dispose a support plate 221 containing a diffusion agent on the light outgoing surface 313 side of the unit lens portions 211 of the diffusion sheet 201. Since the unit lens portions 211 of the diffusion sheet 201 are formed in the approximately trapezoidal columnar shape and the light outgoing surfaces 313 are formed flat, the support plate 221 can be joined to the light outgoing surfaces 313 without a problem. Disposition of the support plate 221 as described above permits a reflection prevention layer 223 and a surface hardened layer 224 to be formed on the light-outgoing-side surface of the diffusion sheet 201, the reflection prevention layer 223 being subjected to a reflection prevention treatment, and the surface hardened layer 224 being subjected to a surface hardening treatment. Note that these layers are disposed on the light-outgoing-side surface of the diffusion sheet 201 through the support plate 221. Among these layers, the reflection prevention layer 223 can preferably suppress the reflection of external light such as illumination in a room, and the like on the screen. Further, even if the screen is touched with a finger, and the like or wiped for cleaning, the surface of the screen is resistant to scratches due to the surface hardened layer 224.

In the rear projection screen 250 arranged as described above, light, which outgoes from the unit lens portions 211 of the diffusion sheet 201 and travels in one direction, is refracted when it is incident on and outgoes from the particles of the diffusion agent contained in the support plate 221 and further is reflected on the outside surfaces of the particles of the diffusion agent and diffused, thereby the light travels in a plurality of directions. Accordingly, the irregular brightness of an image depending on a position of the observer can be reduced. The diffusion agent, which is referred to here, is particles composed of a resin, and the like having a refractive index different from that of the resin, and the like that form the support plate 221, and the particles are scattered in the support plate 221. Acrylic cross-linked beads, glass beads, and the like are used as the diffusion agent. When the support plate 221 is disposed on the diffusion sheet 201, peaks (maximum values) other then the peak at the center of the gain curve described above can be eliminated by the diffusion of the particles of the diffusion agent.

Further, it is preferable in the rear projection screen 250 to make the light-outgoing-side surface of the support plate 221 flat. Making the light-outgoing-side surface of the support plate 221 flat permits the observer to easily view an image because the image can be expressed flat without distortion. Further, since the surface of the diffusion sheet 201 is not curved and has no irregularities, the surface can be simply wiped by hand, thereby it is possible to make the surface of the diffusion sheet 201 free from scratches and dusts.

Further, it is preferable in the rear projection screen 250 to provide the support plate 221 with an ultraviolet ray absorbing action by containing an ultraviolet ray absorption agent in the support plate 221. With this arrangement, ultraviolet rays included in external light can be absorbed by the support plate 221, thereby deterioration (color change, quality deterioration, and the like) of a plastic material constituting the unit lens portions 211, and the like in the diffusion sheet 201 can be prevented. Note that, when a material, which forms the support plate 221, has the ultraviolet ray absorbing action by itself, it is not necessary for the support plate 221 to separately contain the ultraviolet ray absorption agent. An acrylic acid ester resin, and the like can be used to form the support plate 221 as a material having the ultraviolet ray absorbing action. Further, when a resin, which is unlikely to absorb ultraviolet rays, is used as a material for forming the support plate 221, it is preferable to contain benzophenone, benzotriazole, or acrylate or salicylate ultraviolet ray absorbing agent in the support plate 221.

It should be noted that the fourth embodiment is arranged by alternately disposing the unit lens portions 211a, in each of which both the side segments (side surfaces 311a) of the approximately trapezoidal section are composed of curved line segments projecting inward, and the unit lens portions 211b, in each of which both the side segments (side surfaces 311b) of the approximately trapezoidal section are composed of curved line segments projecting outward. However, the manner of disposing the unit lens portions 211a and 211b are not limited to the above, and they can be disposed in any manner other than the above as long as light outgoes in approximately right/left symmetrical directions as a whole. Accordingly, it is preferable in this case that the number of the unit lens portions whose right side segments are composed of the curved line segments projecting inward be approximately the same as the number of the unit lens portions whose left side segments are composed of the curved line segments projecting inward in the diffusion sheet 201 in its entirety, and the number of the unit lens portions whose right side segments are composed of the curved line segments projecting outward be approximately the same as the number of the unit lens portions whose left side segments are composed of the curved line segments projecting outward in the diffusion sheet 201 as a whole.

Further, the fourth embodiment is explained by exemplifying the case that both the side segments (side surfaces 311) of the approximately trapezoidal section of each unit lens portion 211 are composed of the curved line segments. However, one side segment of the approximately trapezoidal section may be composed of the curved line segment, and the other side segment may be composed of a straight line segment (that is, a side surface is a flat surface in place of a curved surface) as long as light outgoes in approximately right/left symmetrical directions as a whole. Accordingly, it is preferable in this case that the number of the side segments, which are composed of the curved line segments projecting inward, of the sections of the unit lens portions be approximately the same as the number of the side segments, which are composed of the curved line segments projecting outward, of the sections of the unit lens portions in the diffusion sheet as a whole, the number of the unit lens portions whose right side segments are composed of the curved line segments projecting inward be approximately the same as number of the unit lens portions whose left side segments are composed of the curved line segments projecting inward in the diffusion sheet as a whole, the number of the unit lens portions whose right side segments are composed of the curved line segments projecting outward be approximately the same as number of the unit lens portions whose left side segments are composed of the curved line segments projecting outward in the diffusion sheet as a whole, and the number of the unit lens portions whose right side segments are composed of the straight lines be approximately the same as number of the unit lens portions whose left side segments are composed of the straight lines in the diffusion sheet as a whole.

Further, in the fourth embodiment described above, the horizontal section of each unit lens portion 211 constituting the diffusion sheet 201 is formed in the isosceles trapezoidal shape (the average angle of the side surfaces 311 is the same in the unit lens portion 211) as shown in FIGS. 2 and 3A. However, the shape of the horizontal section is not limited thereto, and the horizontal section may be formed in a trapezoidal shape in which the average angle of the side surfaces 311 is different in one unit lens portion 211.

EXAMPLES

Specific examples and comparative examples of the first to third embodiments described above will be explained below.

Example 1-1

A diffusion sheet as shown in FIGS. 1 and 2 was manufactured as a diffusion sheet according to an example 1-1.

Specifically, first, a roll-shaped metal mold was prepared by sequentially cutting a metal mold material to form recesses for unit lens portions so that a diffusion sheet, in which a plurality of unit lens portions were continuously disposed, was molded by the metal mold. The plurality of unit lens portions molded by the metal mold were such that the horizontal section of each of the unit lens portions was formed in an isosceles trapezoidal shape, the pitch p of the unit lens portions was set to 70 μm, a lens height h was set to 140 μm, the ratio of the length w of the light outgoing side bottom segment of the triangular section of each light absorbing portion to the pitch p (w/p) was set to 56%, and the angle θ between a light incident surface and a side surface (total reflection surface) was set to 82°.

A UV resin was buried in the roll-shaped metal mold prepared as described above, and the diffusion sheet was manufactured using a PET film substrate having a thickness of 50 μm, wherein the UV resin had a refractive index n1 of 1.55 after it was set.

Thereafter, the light absorbing portions were formed in the V-shaped grooves between the unit lens portions. The light absorbing portions were formed using a light absorption agent composed of black beads dispersed in an acrylic paint having a refractive index n2 of 1.49, wherein the black beads had an average particle size of 3 μm.

The diffusion sheet as shown in FIGS. 1 and 2 was manufactured by the procedure described above. A support plate having a thickness of 2 mm and composed of an MS resin containing a dispersion agent and an ultraviolet ray absorbent was bonded onto the light-outgoing-side surface of the thus manufactured diffusion sheet, and a rear projection screen was obtained by combining the diffusion sheet with a conventionally known Fresnel lens sheet.

Example 1-2

A diffusion sheet as shown in FIG. 4A was manufactured as a diffusion sheet according to an example 1-2.

Specifically, the diffusion sheet was formed in the shape shown in Table 1 as a whole by alternately disposing two types of isosceles trapezoidal columnar unit lens portions, that is, one type of the isosceles trapezoidal columnar unit lens portion had an angle θ1 of 80° between a light incident surface and each side surface (total reflection surface), and the other type of the isosceles trapezoidal columnar unit lens portion had an angle θ2 of 82° between a light incident surface and each side surface (total reflection surface). The diffusion sheet as shown in FIG. 4A was manufactured likewise the example 1-1 except the above arrangement. Further, a rear projection screen provided with the diffusion sheet described above was obtained likewise the example 1-1.

Example 1-3

A diffusion sheet as shown in FIG. 5 was manufactured as a diffusion sheet according to an example 1-3.

Specifically, non-isosceles trapezoidal columnar unit lens portions, in each of which the angle θ3 between one side surface (total reflection surface) and a light incident surface was set to 80° and the angle θ4 between the other side surface (total reflection surface) and the light incident surface was set to 82°, were disposed in such a manner that the surfaces, which correspond to the side segments having the angle θ3, of adjacent unit lens portions were disposed adjacent to each other, and the surfaces, which correspond to the side segments having the angle θ4, of adjacent unit lens portions were disposed adjacent to each other, thereby the diffusion sheet was formed in the shape shown in Table 1. The diffusion sheet as shown in FIG. 5 was manufactured likewise the example 1-1 except the above arrangement. Further, a rear projection screen provided with the diffusion sheet described above was obtained likewise the example 1-1.

Example 1-4

A diffusion sheet as shown in FIG. 6 was manufactured as a diffusion sheet according to an example 1-4.

Specifically, each of the side surfaces (total reflection surfaces) of each of isosceles trapezoidal columnar unit lens portions was formed in a broken-line-shape having a plurality of flat surfaces with a different angle. In each entire side surface, the angle θ5 between a side surface (total reflection surface) on the side of a light incident surface and the light incident surface was set to 80°, and the angle θ6 between the other side surface (total reflection surface) on the side of a light outgoing surface and the light incident surface was set to 82°. The unit lens portions having the broken-line-shaped side surfaces on both the sides thereof were disposed such that the angles between the side surfaces (total reflection surfaces) and the light incident surface of adjacent unit lens portions had the same angle thereby the diffusion sheet was formed in the shape shown in Table 1. The diffusion sheet as shown in FIG. 6 was manufactured likewise the example 1-1 except the above arrangement. Further, a rear projection screen provided with the diffusion sheet described above was obtained likewise the example 1-1.

Comparative Example 1-1

Figure 18A:
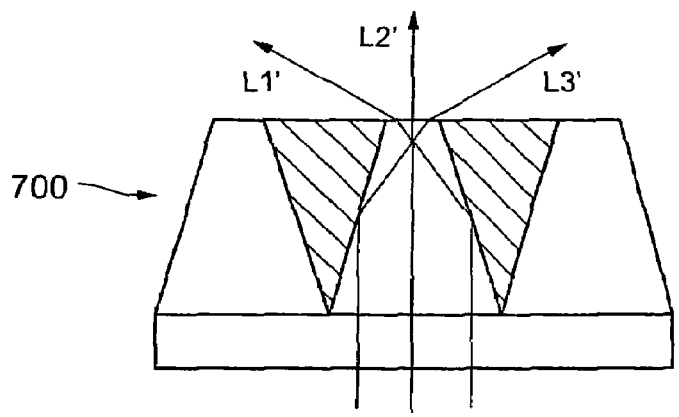
FIG. 18A is a sectional view showing a light traveling direction in a conventional diffusion sheet.
Figure 18B:
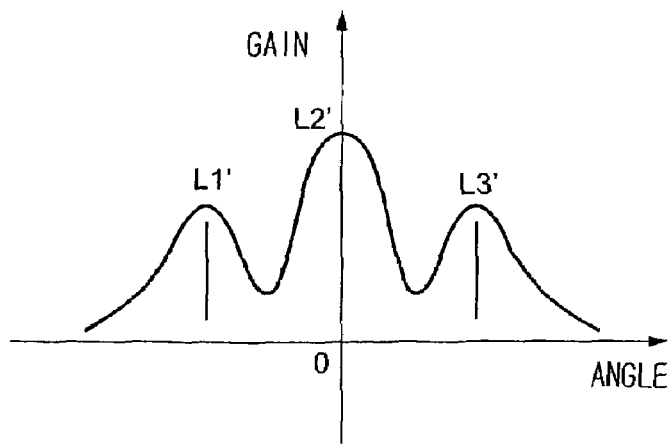
FIG. 18B is a graph showing the relation (gain curve) between a viewing position (angle) and the brightness of an image (gain) in the diffusion sheet shown in FIG. 18A.

A diffusion sheet as shown in FIG. 18A was manufactured as a comparative example 1-1.

Specifically, the diffusion sheet was formed in the shape shown in Table 1 as a whole by disposing isosceles trapezoidal columnar unit lens portions each having an angle of 78° between a light incident side and each side surface (total reflection surface). The diffusion sheet as shown in FIG. 18A was manufactured likewise the example 1-1 except the above arrangement. Further, a rear projection screen provided with the diffusion sheet described above was obtained likewise the example 1-1.

TABLE 1

| | Pitch p (μm) | Lens height h (μm) | Length of bottom segment of light absorbing portion W(μm) | w/p % | h/p % | Angle | |
|---|---|---|---|---|---|---|---|
| Example 1-1 | 70 | 140 | 39 | 56 | 200 | 82° | |
| Example 1-2 | 70 | 140 | 44 | 63 | 200 | 80° (θ1) | 82° (θ2) |
| Example 1-3 | 70 | 140 | 44 (average) | 63 | 200 | 80° (θ3) | 82° (θ4) |
| Example 1-4 | 70 | 140 | 44 | 63 | 200 | 80° (θ5) | 82° (θ6) |
| Comparative Example 1-1 | 70 | 90 | 38 | 54 | 129 | 78° | |

(Result of Evaluation)

Rear projection screens according to the examples 1-1 to 1-4 and the comparative example 1-1 were provided with rear projection type televisions, and images displayed on the screens were evaluated. In each of the examples 1-1 to 1-4, an image having good bright uniformity was viewed at any of viewing angles. In contrast, in the comparative example, an image having bad bright uniformity was viewed even if it was viewed from the front of it, and, further, a viewed image had irregular brightness which was emphasized depending on a viewing angle.

Next, specific examples and comparative examples of the fourth embodiment described above will be explained.

Example 2-1

A diffusion sheet as shown in FIGS. 12 and 13 was manufactured as a diffusion sheet according to an example 2-1.

Specifically, first, a roll-shaped metal mold was prepared by sequentially cutting a metal mold material to form recesses for unit lens portions so that a diffusion sheet, in which a plurality of unit lens portions were continuously disposed, was molded by the metal mold. The plurality of unit lens portions were molded by the metal mold such that the horizontal section of each of the unit lens portions was formed in an isosceles trapezoidal shape, the width (pitch) of the light incident surface of the unit lens portions was set to 70 µm, the distance (lens height) between the light incident surface and the light outgoing surface of the unit lens portions was set to 150 µm, the ratio of the difference between the width of the light incident surface of the unit lens portion and the width of the light outgoing surface thereof to the width of the light incident surface of the unit lens portion was set to 60%, and the average angle θ between the light incident surface and the total reflection surface was set to 82°.

When the roll-shaped metal mold was formed, first, a mold material was cut and trapezoidal columnar recesses for unit lens portions were alternately formed, and then the remaining spaces of the mold material were cut, and trapezoidal columnar recesses for unit lens portions were formed likewise. The roll-shaped metal mold was manufactured such that the projections between the recesses for adjacent unit lens portions tilted in the sequence of "left, right", "left, right", "left, right", . . . .

A UV resin was buried in the roll-shaped metal mold prepared as described above, and the diffusion sheet was manufactured using a PET film substrate having a thickness of 50 µm, wherein the UV resin had a refractive index n1 of 1.55 after it was set.

Thereafter, light absorbing portions were formed in the V-shaped grooves between the unit lens portions. The light absorbing portions were formed using a light absorption agent composed of black beads having an average particle size of 3 µm and dispersed in an acrylic paint having a refractive index n2 of 1.49.

The diffusion sheet as shown in FIGS. 12 and 13 was manufactured by the procedure described above. A support plate having a thickness of 2 mm and composed of an MS resin containing an dispersion agent and an ultraviolet ray absorbent was bonded onto the light outgoing side of the thus manufactured diffusion sheet, and a rear projection screen was obtained by combining the diffusion sheet with a conventionally known Fresnel lens sheet.

Comparative Example 2-1

Figure 19A:
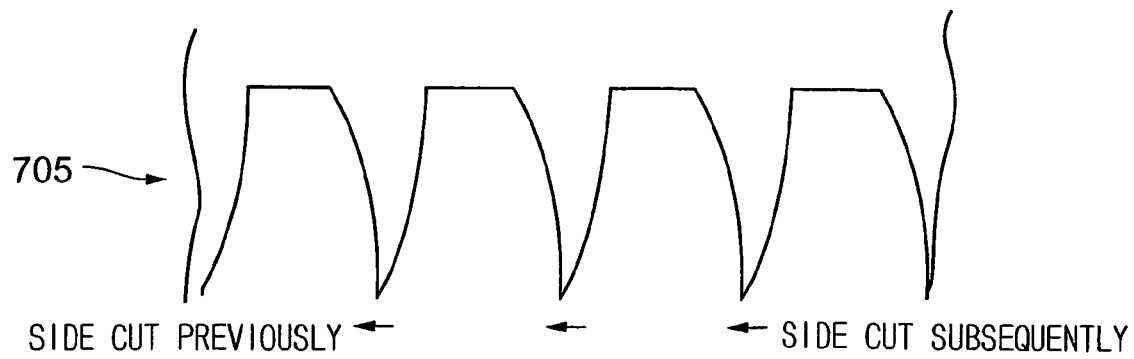
FIG. 19A is a sectional view showing an example of mold for manufacturing the conventional diffusion sheet.
Figure 19B:
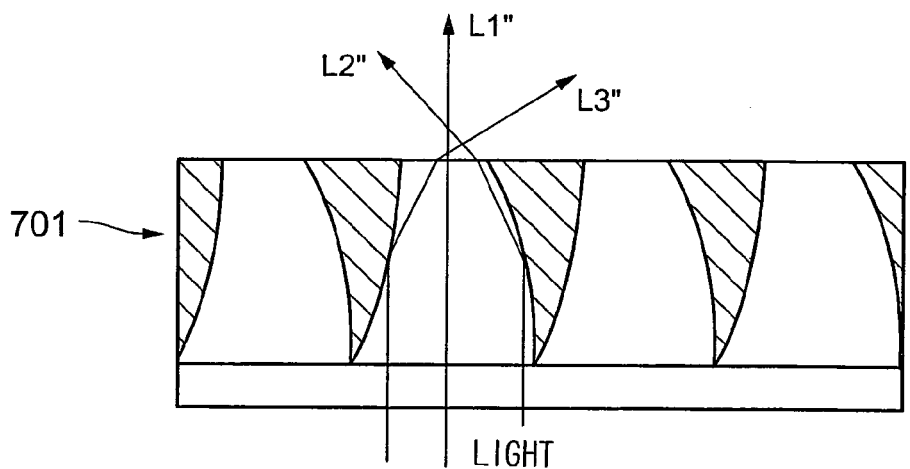
FIG. 19B is a sectional view showing a light traveling direction in a diffusion sheet manufactured by the mold shown in FIG. 19A.
Figure 19C:
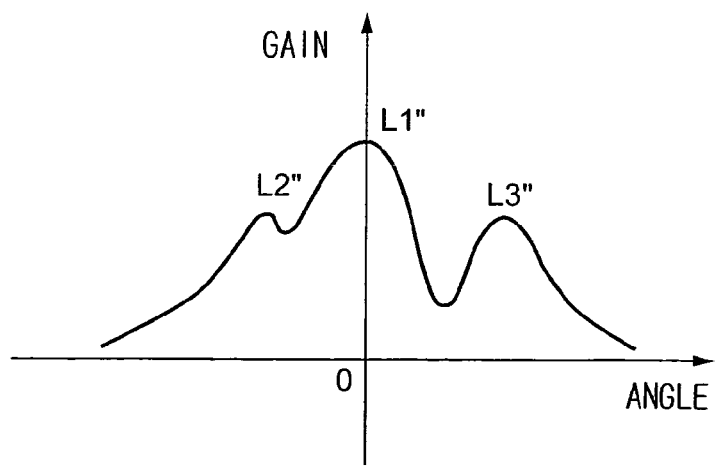
FIG. 19C is a graph showing the relation (gain curve) between a viewing position (angle) and the brightness of an image (gain) in the diffusion sheet shown in FIG. 19B.

A roll-shaped metal mold for a diffusion sheet was manufactured by the same procedure as that of the example 2-1 except that the recesses for unit lens portions were formed by sequentially cutting a mold material from an end thereof. Since the roll-shaped metal mold was manufactured as described above, all the projections between the recesses for adjacent unit lens portions tilted in the same direction as shown in FIG. 19A. A diffusion sheet as shown in FIG. 19B was manufactured likewise the example 2-1 by molding it with the metal mold manufactured as described above. Further, a rear projection screen provided with the diffusion sheet described above was obtained likewise the example 2-1.

(Result of Evaluation)

Rear projection screens according to the example 2-1 and the comparative example 2-1 were provided with rear projection type televisions, and images displayed on the screens were evaluated. In the example 2-1, when several particular points on the screen were viewed from a right side and a left side in a horizontal direction, if the angle (observing angle) between the viewing direction on the right side and a vertical line passing through a point being viewed was the same as the angle (observing angle) between the viewing direction on the left side and the vertical line, the point had the same brightness, and even if the viewing angle was changed, the brightness changed gently, and thus an image could be easily viewed on the screen. In contrast, in the comparative example 2-1, even if the viewing angles were the same, the brightness of an image viewed on a right side was different from that of the image viewed on a left side.

Further, the gains in a horizontal direction of the diffusion sheets according to the example 2-1 and the comparative example 2-1 were measured. As a result, in the example 2-1, a gentle gain curve was obtained which was uniform on the right and left sides and had a peak at a center. In contrast, in the comparative example 2-1, a gain curve was nonuniform on the right and left sides.

The invention claimed is:

1. A diffusion sheet that diffuses light incident thereon from a light incident side and causes the light to outgo from a light outgoing side, comprising:

a plurality of approximately trapezoidal columnar unit lens portions disposed such that long-axis directions thereof are in parallel with each other, wherein all surfaces of the unit lens portions, which correspond to long bottom segments of approximately trapezoidal sections of the unit lens portions vertical to the long-axis directions thereof, are disposed on a light-incident-side flat surface; and a plurality of light absorbing portions interposed between adjacent unit lens portions of the plurality of unit lens portions to absorb external light incident from the light outgoing side, wherein the plurality of unit lens portions are arranged such that a part of the light incident on the unit lens portions from the light incident side is totally reflected on surfaces of the unit lens portions corresponding to side segments of the approximately trapezoidal sections vertical to the long-axis directions of the unit lens portions, and a section of each of the light absorbing portions vertical to a long-axis direction thereof interposed between adjacent unit lens portions of the plurality of unit lens portions is formed in an approximately triangular shape, and a vertex of the section on the light incident side thereof is composed of a straight line segment having a width of at least 2 µm.

2. A diffusion sheet according to claim 1, wherein a distance between a long bottom segment and a short bottom segment of an approximately trapezoidal section of each of the unit lens portions vertical to the long-axis direction thereof is 120% or more to 400% or less of a length of the long bottom segment.

3. A diffusion sheet according to claim 1, wherein the approximately trapezoidal section of each of the unit lens portions vertical to the long-axis direction thereof has a first angle between one side segment, and a light-incident-side long bottom segment, and a second angle between the other side segment, and the light-incident-side long bottom segment, the first angle being different from the second angle.

4. A diffusion sheet according to claim 1, wherein a length of a light-outgoing-side bottom segment of a section of each of the light absorbing portions vertical to a long-axis direction thereof is 40% or more to 100% or less of a length of the light-incident-side long bottom segment of the section of each of the unit lens portions vertical to the long-axis direction thereof.

5. A diffusion sheet according to claim 1, further comprising a support plate disposed on the light outgoing side of the unit lens portions and containing a diffusion agent.

6. A diffusion sheet according to claim 5, wherein a light-outgoing-side surface of the support plate is formed flat.

7. A diffusion sheet according to claim 5, wherein the support plate has an ultraviolet ray absorbing action.

8. A diffusion sheet according to claim 1, wherein the unit lens portions comprise a radiation setting resin.

9. A rear projection screen comprising:

a diffusion sheet according to claim 1; and a Fresnel lens sheet disposed on the light incident side of the diffusion sheet.

* * * * *